US008861877B2

(12) United States Patent
Du

(10) Patent No.: US 8,861,877 B2
(45) Date of Patent: Oct. 14, 2014

(54) SYSTEM AND METHOD FOR IMPROVING DECODER PERFORMANCE BY USING MULTIPLE DECODING CHANNELS

(75) Inventor: Xuanming Du, San Jose, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 103 days.

(21) Appl. No.: 13/553,299

(22) Filed: Jul. 19, 2012

(65) Prior Publication Data

US 2014/0023285 A1 Jan. 23, 2014

Related U.S. Application Data

(62) Division of application No. 13/553,049, filed on Jul. 19, 2012.

(51) Int. Cl.
*G06K 9/36* (2006.01)

(52) U.S. Cl.
USPC .......................................................... 382/233

(58) Field of Classification Search
None
See application file for complete search history.

(56) References Cited

U.S. PATENT DOCUMENTS

| | | | |
|---|---|---|---|
| 5,233,348 A | 8/1993 | Pollmann et al. | |
| 5,461,421 A | 10/1995 | Moon | |
| 5,489,944 A | 2/1996 | Jo | |
| 5,654,806 A | 8/1997 | Truong | |
| 5,673,209 A | 9/1997 | Heiney et al. | |
| 5,790,705 A | 8/1998 | Anderson et al. | |
| 5,812,791 A | 9/1998 | Wasserman et al. | |
| 5,818,364 A | 10/1998 | Hintzman et al. | |
| 5,825,312 A | 10/1998 | D'Ortenzio | |
| 5,883,823 A | 3/1999 | Ding | |
| 5,889,893 A | 3/1999 | Robson | |
| 6,121,905 A | 9/2000 | Redford | |
| 6,263,021 B1 | 7/2001 | Sethuraman et al. | |
| 6,310,921 B1 * | 10/2001 | Yoshioka et al. | 375/240.26 |
| 6,657,561 B1 * | 12/2003 | Hanna | 341/50 |
| 6,956,511 B2 | 10/2005 | Thomas et al. | |
| 6,985,635 B2 | 1/2006 | Chen et al. | |
| 7,352,811 B2 | 4/2008 | Stone et al. | |
| 7,424,162 B2 | 9/2008 | Kitamura | |
| 7,565,021 B2 * | 7/2009 | Feng et al. | 382/239 |

(Continued)

OTHER PUBLICATIONS

U.S. Appl. No. 13/553,049, Restriction Requirement dated Mar. 11, 2014.

(Continued)

*Primary Examiner* — Tsung-Yin Tsai
(74) *Attorney, Agent, or Firm* — Larry E. Henneman, Jr.; Gregory P. Gibson; Henneman & Associates, PLC

(57) ABSTRACT

A codec includes an encoder having a quantization level generator that defines a quantization level specific to a block of values (e.g., transform coefficients), a quantizer that quantizes the block of transform coefficients according to the block-specific quantization level, a run-length encoder, and an entropy encoder. The quantization level is defined to result in at least a predetermined number (k) of quantized coefficients having a predetermined value. The amount of data compression by the encoder is proportional to (k). The codec also includes a decoder having entropy and run-length decoding sections whose throughputs are proportional to (k). The decoder takes advantage of this increased throughput by further decoding coefficients in parallel using a plurality of decoding channels. Methods for encoding and decoding data are also disclosed. The invention is well-suited to quantization, entropy, and/or run-length-based codecs, such as JPEG.

23 Claims, 15 Drawing Sheets

(56) References Cited

U.S. PATENT DOCUMENTS

| | | | |
|---|---|---|---|
| 7,720,017 B2 * | 5/2010 | Khan | 370/310 |
| 7,983,562 B1 * | 7/2011 | Yap et al. | 398/78 |
| 8,233,545 B2 | 7/2012 | Ahuja et al. | |
| 2002/0168112 A1 | 11/2002 | Schwartz et al. | |
| 2003/0079071 A1 * | 4/2003 | Warren et al. | 710/107 |
| 2004/0117418 A1 | 6/2004 | Vainsencher et al. | |
| 2005/0147308 A1 | 7/2005 | Kitamura | |
| 2006/0204119 A1 * | 9/2006 | Feng et al. | 382/250 |
| 2006/0227815 A1 * | 10/2006 | Khan | 370/535 |
| 2007/0204318 A1 * | 8/2007 | Ganesh et al. | 725/118 |
| 2008/0046698 A1 | 2/2008 | Ahuja et al. | |
| 2009/0125538 A1 * | 5/2009 | Rosenzweig et al. | 707/101 |
| 2011/0206135 A1 | 8/2011 | Drugeon et al. | |
| 2012/0233523 A1 | 9/2012 | Krishnamoorthy | |
| 2014/0023284 A1 | 1/2014 | Du | |
| 2014/0023286 A1 | 1/2014 | Du | |

OTHER PUBLICATIONS

U.S. Appl. No. 13/553,402, Restriction Requirement dated May 24, 2013.
U.S. Appl. No. 13/553,402, Office Action dated Aug. 7, 2013.
U.S. Appl. No. 13/553,402, Notice of Allowance dated Feb. 6, 2014.
U.S. Appl. No. 13/553,049 Office Action, dated Apr. 15, 2014.
U.S. Appl. No. 13/553,049, filed Jul. 19, 2012, Office Action dated Jul. 18, 2014.

* cited by examiner

| x | x | x | x | 0 | x | x | x |
|---|---|---|---|---|---|---|---|
| x | x | x | x | x | x | x | 0 |
| x | x | 0 | x | x | x | 0 | x |
| x | 0 | x | x | x | 0 | 0 | 0 |
| x | x | x | x | 0 | 0 | x | 0 |
| x | x | 0 | 0 | 0 | 0 | 0 | 0 |
| x | 0 | 0 | 0 | 0 | 0 | 0 | 0 |
| 0 | 0 | 0 | 0 | 0 | 0 | 0 | 0 |

Number of zeros (k) after quantization: $\geq 32$

Number of non-zeros after quantization: $\leq 32$

Decoder Speed: ~ 2 times

| x | x | 0 | x | x | x | 0 | 0 |
|---|---|---|---|---|---|---|---|
| x | x | x | x | x | 0 | 0 | 0 |
| x | 0 | x | 0 | 0 | 0 | 0 | x |
| x | x | x | 0 | 0 | 0 | 0 | 0 |
| 0 | x | 0 | x | 0 | 0 | 0 | 0 |
| x | 0 | 0 | 0 | 0 | x | 0 | 0 |
| 0 | 0 | x | 0 | 0 | 0 | 0 | 0 |
| 0 | 0 | 0 | 0 | 0 | 0 | 0 | 0 |

Number of zeros (k) after quantization: $\geq 43$

Number of non-zeros after quantization: $\leq 21$

Decoder Speed: ~ 3 times

| x | x | x | x | x | x | 0 | 0 |
|---|---|---|---|---|---|---|---|
| x | x | x | 0 | 0 | 0 | 0 | 0 |
| 0 | x | x | 0 | x | 0 | 0 | 0 |
| x | x | 0 | 0 | 0 | 0 | 0 | 0 |
| x | 0 | 0 | x | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

FIG. 4C

Number of zeros (k) after quantization: $\geq 48$

Number of non-zeros after quantization: $\leq 16$

Decoder Speed: ~ 4 times

— 400C

| x0 | x1 | x4 | 0 | 0 | x10 | 0 | 0 |
|---|---|---|---|---|---|---|---|
| x2 | x3 | x5 | 0 | 0 | 0 | 0 | 0 |
| 0 | x6 | 0 | x11 | 0 | 0 | 0 | 0 |
| x7 | x9 | 0 | 0 | 0 | 0 | 0 | 0 |
| x8 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

FIG. 4D

Number of zeros (k) after quantization: $\geq 52$

Number of non-zeros after quantization: $\leq 12$

Decoder Speed: ~ 5 times

— 400D

| | RLE Data (Run-Length, Next Value) | Pointer Increase in No. of Storage Locations | Storage Location Pointed To After Increase | Non-Zero Coefficient Written To Storage Location |
|---|---|---|---|---|
| 802(0) | (0, x0) | 0 | 0 | x0 |
| 802(2) | (0, x1) | 1 | 1 | x1 |
| | (0, x2) | 1 | 2 | x2 |
| 802(4) | (1, x3) | 2 | 4 | x3 |
| | (0, x4) | 1 | 5 | x4 |
| 802(6) | (1, x5) | 2 | 7 | x5 |
| | (0, x6) | 1 | 8 | x6 |
| 802(8) | (0, x7) | 1 | 9 | x7 |
| | (0, x8) | 1 | 10 | x8 |
| | (0, x9) | 1 | 11 | x9 |
| 802(10) | (3, x10) | 4 | 15 | x10 |
| | (1, x11) | 2 | 17 | x11 |
| 802(12) | E.O.B. | N/A | N/A | N/A |

FIG. 8A

SYSTEM AND METHOD FOR IMPROVING DECODER PERFORMANCE BY USING MULTIPLE DECODING CHANNELS

RELATED APPLICATIONS

This application is a division of co-pending U.S. patent application Ser. No. 13/553,049, filed on Jul. 19, 2012, by the same inventor, which is incorporated herein by reference in its entirety. This incorporation by reference of U.S. patent application Ser. No. 13/553,049 is intended notwithstanding any defect(s) in the priority claim.

BACKGROUND OF THE INVENTION

1. Field of the Invention

This invention relates generally to data compression, and more particularly to an Encoder-Decoder ("codec") system. Even more particularly, this invention relates to improving decoder performance in a single-encoder codec system.

2. Description of the Background Art

Demand for high-definition (HD) media (e.g., video, still images, etc.) has increased dramatically in recent years. As a result, the demand for media devices (e.g., cameras, mobile telephones, tablet computers, etc.) has also increased. A primary design goal for modern media devices is ensuring uninterrupted media throughput.

Codecs are used in media devices to increase data compression and throughput by encoding the media. In a codec, the encoder receives the media data and encodes it into a compressed data stream. The compressed data stream is eventually transferred to a decoder, which decodes the compressed data and provides it at an output. Unfortunately, the decoder often creates a bottleneck in the data stream, which is problematic when the data output rate of the decoder is insufficient to play the media in a desired manner (e.g., at the desired frame rate, at the desired resolution, etc.) or results in data being lost.

Codecs that employ Run-Length and Entropy encoding and decoding techniques (e.g., JPEG, MPEG, etc.) are particularly prone to decoder bottlenecking, because the content of the compressed data stream from the encoder is unpredictable. This unpredictability causes the decoding process to take too long and image data to be lost and/or forces the media device to operate too slowly. This unpredictability is also what limits prior art decoders to a single decoding channel.

What is needed, therefore, is a system and method that improves decoder performance in a codec system. What is also needed is a system and method that controls data compression and decoder performance during the initial encoding process. What is also needed is a system and method that greatly reduces or eliminates bottlenecking during the decoding process.

SUMMARY

The present invention overcomes the problems associated with the prior art by providing an encoder and decoder system that improves data compression and decoder performance by controlling a quantization process for each block of data during encoding. The invention facilitates, as part of the encoding process, quantizing each block of data to produce a quantized block including at least a predetermined number (or percentage) of quantized coefficients having a predetermined value (e.g., a value of zero). Moreover, even though the decoder receives a single compressed data stream as input, the decoder is able to decode data associated with two or more pluralities of coefficients in parallel. The parallel decoding is facilitated by increased throughput in the entropy and run-length decoding processes, because the throughput is controlled by the quantization process. An improved run-length decoding system and method is also disclosed.

An encoder according to the invention includes an input that receives a block of values (e.g., a block of transform coefficients from a transform unit), a quantization level generator that defines a quantization level for the block of transform coefficients, and a quantizer that quantizes the block of transform coefficients based on the quantization level to produce a block of quantized coefficients. The quantization level is defined such that at least a predetermined number (k) (e.g., greater than or equal to half, etc.) of the quantized coefficients have a predetermined value (e.g., a value of zero) following quantization. The quantizer quantizes the block of transform coefficients in part by dividing each transform coefficient by the quantization level and by quantization data associated with the transform coefficient. While the encoder is well-suited to JPEG applications, the quantization level generator and quantizer can be implemented in any encoder where quantization of a block of values is desirable.

According to a particular embodiment, the quantization level generator determines the quantization level by initially quantizing the block of transform coefficients based on quantization data and a default quantization level (e.g., a value of one) to produce a test block of quantized coefficients. If the test block includes at least the predetermined number of coefficients having a zero value (the predetermined value), then the default quantization level is used as the quantization level for the block. If the test block of quantized coefficients does not include enough zeros, then a new quantization level is determined, for example, by identifying the $k^{th}$ smallest quantized coefficient in the test block and setting the new quantization level to a value greater than twice the value of the $k^{th}$ smallest quantized coefficient. In a particular embodiment, the quantizer completes quantization by further quantizing the test block by the new quantization level. The encoder can also include a quantization level output for outputting the quantization level, for example, to a first-in-first-out (FIFO) memory.

In another particular embodiment, the encoder further includes a discrete cosine transform (DCT) unit to generate the block of transform coefficients, a zig-zag unit that performs a zig-zag operation to arrange the block of quantized coefficients in a linear data stream of a plurality of quantized coefficients, a run-length encoder that encodes the plurality of quantized coefficients into run-length-encoded (RLE) data, and an entropy encoder that entropy encodes the RLE data. The encoder, for example, may be a JPEG or MPEG encoder. The predetermined number (k) can be further selected to control the amount of compression of the input data and/or throughput of the decoder.

A decoder according to the invention includes an input that receives an RLE data stream including RLE data associated with a series of blocks of data, such as blocks of image data of an image, a run length decoder that decodes RLE data associated with consecutive blocks into consecutive pluralities of values (e.g., quantized coefficients), and a plurality of decoding channels operating in parallel. Each decoding channel can decode a plurality of coefficients into a block of decoded image data. The consecutive pluralities of coefficients are sequentially provided to different ones of the decoding channels such that two or more pluralities of coefficients are at least partially decoded in parallel by their respective decoding channels. For example, a second plurality of coefficients can be decoded by a second decoding channel at least partially concurrently with a first plurality of coefficients being decoded by a first decoding channel. The decoder can also include an entropy decoder that receives an entropy-encoded data stream and generates the RLE data stream, for example, in a JPEG implementation.

According to a particular embodiment, pluralities of coefficients are pluralities of quantized coefficients and each decoding channel includes a quantization level input that receives a quantization level associated with a plurality of quantized coefficients being decoded. Each decoding channel also includes a dequantizer that dequantizes the plurality of quantized coefficients according to the associated quantization level received via the quantization level input (e.g., to produce a block of transform coefficients). According to one embodiment, the plurality of decoding channels sequentially reads quantization levels from a FIFO memory. Each decoding channel can also include an inverse zig-zag unit that performs an inverse zig-zag process on the plurality of quantized coefficients to produce a block of quantized coefficients and an inverse DCT unit that performs an inverse DCT on the block of transform coefficients to produce a block of decoded image data.

As indicated above, the run-length and entropy decoder portions of the decoder operate at a rate sufficient such that at least two of the decoding channels operate in parallel. In particular, the entropy and run-length decoder portions operate at a speed that is proportional to the number of coefficients in the quantized data that have a predetermined value. During decoding, the run-length decoder accesses a buffer defining a plurality of consecutively-accessible storage locations. To decode RLE data, the run-length decoder stores a predetermined value (e.g., zero) in all of the buffer's storage locations. The run-length decoder then writes a first non-zero value to a first storage location (e.g., indicated by a pointer) based on the RLE data, jumps (e.g., moves the pointer) to a next storage location based on the RLE data, and then writes a next non-zero value to the second storage location based on the RLE data. In a particular embodiment, the RLE data includes pairs of values where one of the values indicates a run-length of zeros. The run-length decoder uses the run-length value in each pair to determine how many storage locations in the buffer to jump before writing the next non-zero value. When the run-length decoder includes a pointer, jumping storage locations can be accomplished by incrementing the pointer by one plus a run-length value defined in the RLE data.

Methods for generating encoded data are also described. A method for encoding data according to the invention includes the steps of receiving a block of values (e.g., a block of transform coefficients generated by a transform unit), defining a quantization level associated with the block of transform coefficients, and quantizing the block of transform coefficients based on the quantization level to produce a block of quantized coefficients. The quantization level is defined such that at least a predetermined number (k) of the quantized coefficients have a predetermined value (e.g., a value of zero). According to a particular method, the value (k) is greater than or equal to one-half of the number of quantized coefficients in the block of quantized coefficients. The value of (k) can also be defined to control the speed of an entropy decoding section and a run-length decoding section of a decoder. According to a particular method, the quantization level for a particular block can be determined, in part, by initially quantizing the block based on quantization data and a default quantization level (e.g., a value of one) to generate a test block of quantized coefficients and then determining if the test block has at least the predetermined number of coefficients having the predetermined value as described above. If not, a new quantization level can be determined for the block, and the test block can be further quantized by the new quantization level. While the encoding method is well-suited to JPEG applications, the quantization process is applicable to any encoding method where quantizing a block of values is desirable.

A method for decoding encoded data is also described. The method includes receiving an RLE data stream including RLE data associated with a series of blocks of data, such as blocks of image data of an image, run-length decoding RLE data associated with a first block of image data into a first plurality of values (e.g., quantized coefficients), and decoding the first plurality of coefficients using a first decoding channel selected from a plurality of decoding channels operating in parallel. The method also includes the steps of run-length decoding RLE data associated with a second block of image data into a second plurality of coefficients, and decoding the second plurality of coefficients using a second decoding channel in the plurality of decoding channels. The method is performed such that the steps of decoding the first and second pluralities of coefficients occur at least partially concurrently. A method for run-length decoding according to the invention can include the steps of storing a predetermined value (e.g., zero) in each of a plurality of consecutively-accessed storage locations in a buffer, and then using run values in the RLE data to jump to the storage locations to which non-zero coefficients will be written, as described above. The speed of the run-length decoding (and also entropy decoding) is proportional to the number of coefficients having the predetermined value.

BRIEF DESCRIPTION OF THE DRAWINGS

The present invention is described with reference to the following drawings, wherein like reference numbers denote substantially similar elements:

FIG. 4A shows an exemplary block of quantized coefficients including at least thirty-two (32) coefficients having a predetermined value;

FIG. 4B shows an exemplary block of quantized coefficients including at least forty-three (43) coefficients having a predetermined value;

FIG. 4C shows an exemplary block of quantized coefficients including at least forty-eight (48) coefficients having a predetermined value;

FIG. 4D shows an exemplary block of quantized coefficients including at least fifty-two (52) coefficients having a predetermined value;

FIG. 8A is a table 800 showing run-length-encoded data for the block of FIG. 4D and associated run-length-decoding parameters associated with the run-length decoder of FIG. 7;

DETAILED DESCRIPTION

The present invention overcomes the problems associated with the prior art, by providing an encoder and decoder system that improves data compression and decoder performance by controlling a quantization process for each block of data during encoding. As part of the encoding process, each block of data is quantized such that the quantized block includes at least a predetermined number (or percentage) of quantized coefficients having a predetermined value. Additionally, the speed of the decoder is increased because the controlled quantization process facilitates fast entropy and run-length decoding and the decoder decodes encoded data in parallel. In the following description, numerous specific details are set forth (e.g., a decoder speed control input, methods for generating block-specific quantization levels, etc.) in order to provide a thorough understanding of the invention. Those skilled in the art will recognize, however, that the invention may be practiced apart from these specific details. In other instances, details of well-known encoding and decoding techniques (e.g., Discrete Cosine Transformations, etc.) and components have been omitted, so as not to unnecessarily obscure the present invention.

Figure 1:
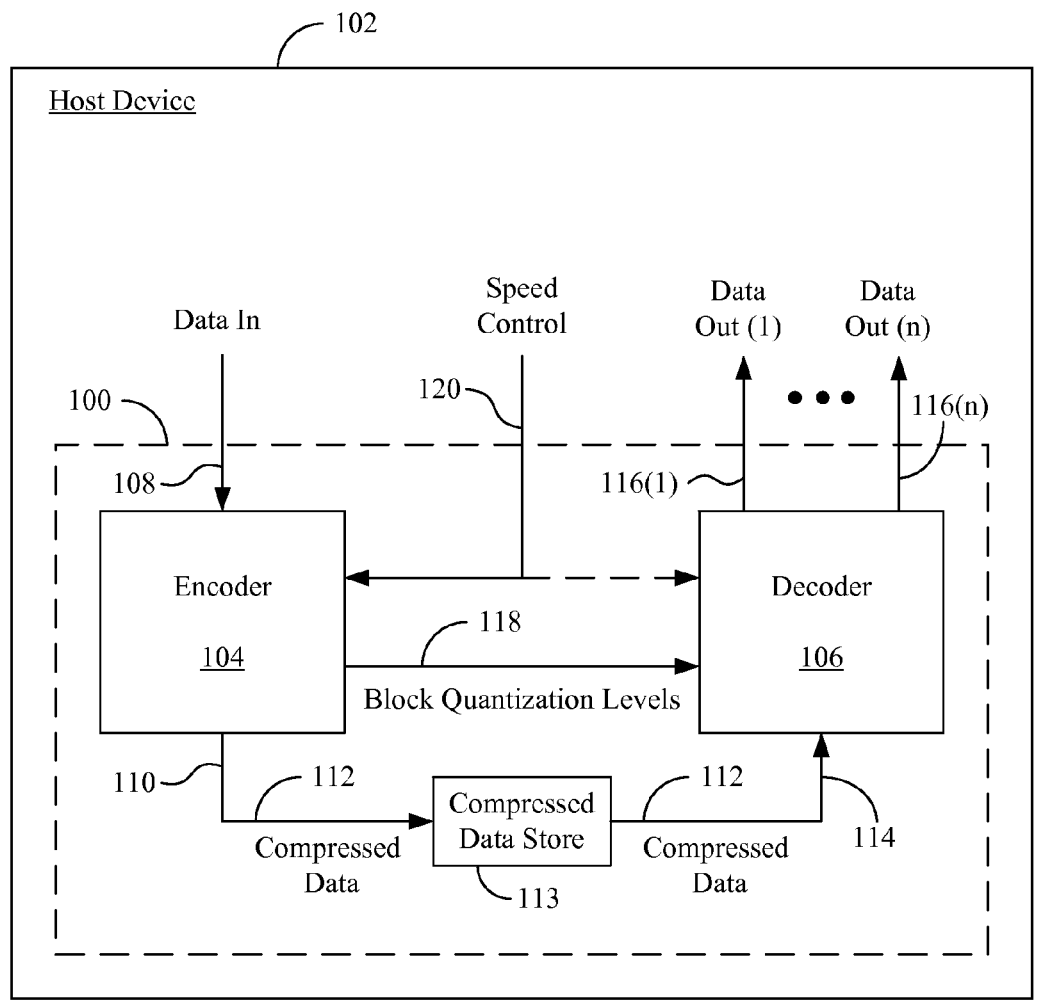
FIG. 1 is a block diagram showing an embodiment of an encoder and decoder system according to the present invention.

FIG. 1 is a block diagram showing an encoder and decoder system ("codec") 100 according to the present invention, which is integrated in a host device 102. Codec 100 encodes data into compressed data and decodes compressed data into decoded data as will be described in greater detail below. Host device 102 is some device (e.g., a display driver, media processor, image sensor, etc.) that would benefit from data compression. In the present embodiment, host device 102 is an integrated circuit, and codec 100 is implemented in integrated circuitry. However, codec 100 can also be implemented in software, firmware, and the like, and portions of codec 100 (e.g., the encoder and decoder portions) can also be implemented separately.

Codec 100 includes an encoder 104 and a decoder 106. Encoder 104 receives un-encoded data at its input 108, encodes the data, and outputs a compressed data stream at its output 110. The compressed data stream is provided, via a compressed data path 112, to a compressed data store 113 and from compressed data store 113 to an input 114 of decoder 106. Decoder 106 receives the compressed data stream on its input 114, decodes the compressed data using a plurality of decoding channels (see FIG. 2), and outputs the decoded data via a plurality of outputs 116(1)-116(n). Because decoder 106 is capable of decoding the compressed data in parallel using its plurality of decoding channels, decoder 106 advantageously increases the speed of the decoding process over the prior art.

Compressed data store 113 is a memory (e.g., a frame buffer, etc.) integrated in codec 100 and/or in host device 102. Compressed data store 113 might also be a memory external to host device 102, such as volatile memory (e.g., RAM) or non-volatile memory (e.g., flash memory, etc.). Because it might be desirable to transmit compressed data directly between encoder 104 and decoder 106, utilizing compressed data store 113 can be optional.

In the present embodiment, codec 100 is a JPEG codec and will be described as such. However, as will be described below, the invention is well-suited to any codec that uses quantization, run-length and/or entropy encoding and/or decoding techniques. In the present embodiment, encoder 104 encodes a series of eight-by-eight (8×8) blocks of image data, where each block includes data associated with sixty-four (64) pixels of an image. As part of its encoding process, encoder 104 defines a specific quantization level for each block and quantizes each block based on the defined quantization level (and other quantization data). Encoder 104 also outputs a series of quantization levels to decoder 106 via a block quantization level path 118, where each of the quantization levels is associated with a specific block of data undergoing JPEG encoding. Decoder 106 receives the block-specific quantization levels and utilizes them to dequantize the associated blocks of data during the decoding process.

FIG. 1 also shows that codec 100 is responsive to a speed control signal received from, for example, the host device 102 on a speed control input 120. The speed control signal applied to speed control input 120 is provided to the encoder 104 and, optionally, to the decoder 106. As will be described in greater detail below, the speed control signal can be used to control the quantization process in the encoder 104, which in turn controls the amount of data compression as well as the output rate of the decoder 106. Optionally, the speed control signal can also be provided to the decoder 106 to facilitate additional functionality, as will be described below.

Figure 2:
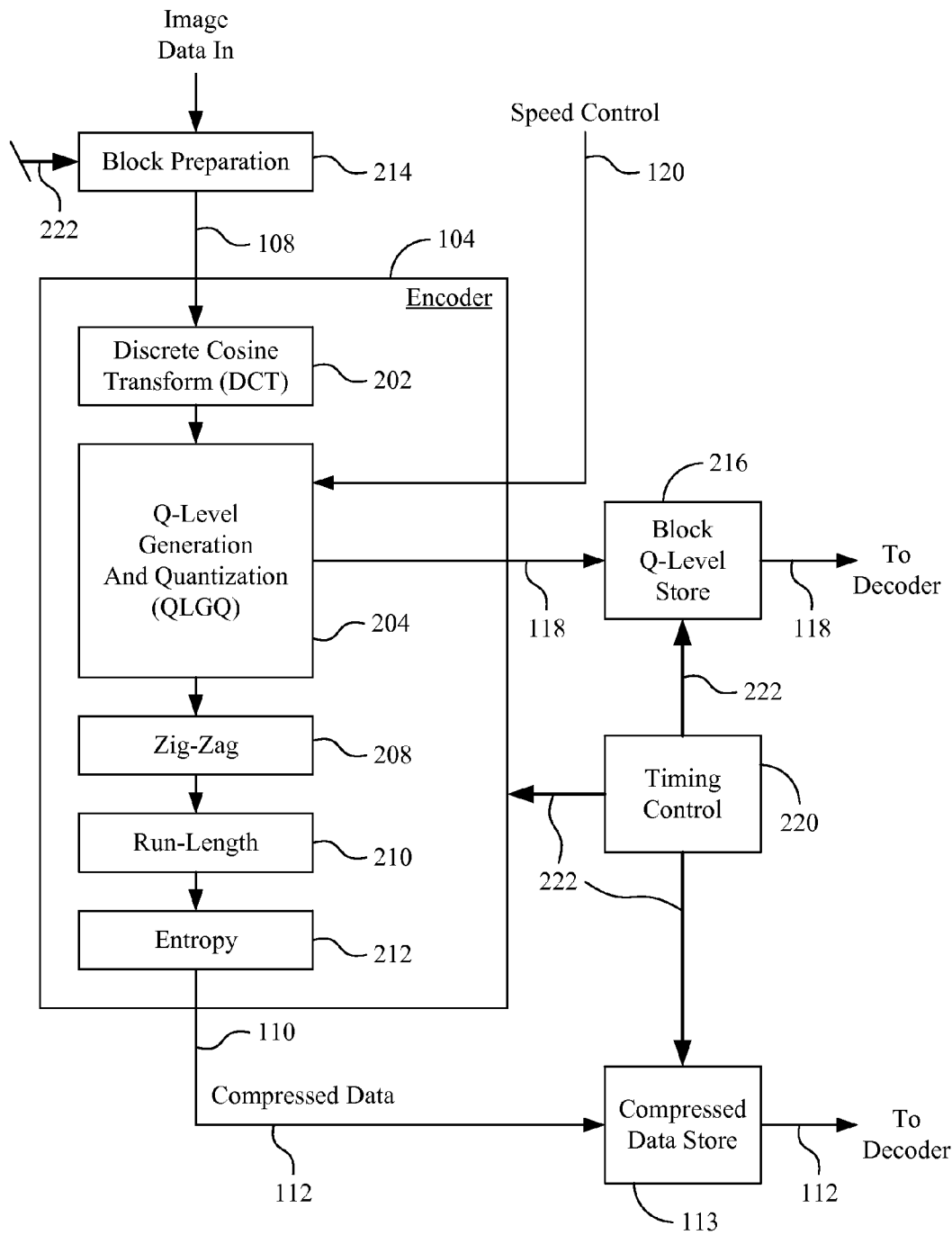
FIG. 2 is a block diagram showing the encoder of FIG. 1 in greater detail.

FIG. 2 is a block diagram showing encoder 104 of codec 100 in greater detail. In the JPEG embodiment shown, encoder 104 includes a Discrete Cosine Transform (DCT) unit 202, a quantization level ("Q-Level") generation and quantization (QLGQ) unit 204, a zig-zag unit 208, a run-length encoder 210, and an entropy encoder 212. Also shown in FIG. 2 is a block preparation unit 214, a block Q-level store 216, and a timing control unit 220, as well as compressed data store 113.

Encoder 104 receives a series of 8-by-8 blocks of image data on its input 108 from block preparation unit 214. Block preparation unit 214 is shown as a component of host device 102 but can also be incorporated into encoder 104. Block preparation unit 214 formats image data from the host device 102 into blocks of image data compatible with JPEG encoder 104. For example, block preparation unit 214 can convert image data from one color space (e.g., red, green, blue (RGB), etc.) into another color space (e.g., YUV, YCbCr, etc.). Block preparation unit 214 can also divide a frame of image data into a plurality of blocks of image data for encoding purposes, as well as, separate the different color space components (e.g., Y, Cb, and Cr, etc.) into different streams of image data, each containing data for one of the different color-space components.

Each block of image data provided to encoder 104 undergoes the following encoding process. First, DCT unit 202 performs a DCT on the block, whereby the block is transformed into a block of sixty-four (64) transform coefficients in the frequency domain. Each block of DCT coefficients includes a DC component coefficient and sixty-three (63) AC component coefficients as is known in the art.

The block of DCT coefficients is then provided to the QLGQ unit 204, which determines a Q-level for the block of DCT coefficients. The Q-level for the block is based on quantization data, the desired amount of data compression, and/or the desired output rate of the decoder 106. Specifically, the Q-level is defined such that, after quantization is complete, the block of DCT coefficients will result in a block of quantized coefficients where a predetermined number (k) of the quantized coefficients have a predetermined value. In the present embodiment, the predetermined value is zero. In other words, the QLGQ unit 204 provides a means for defining a block-specific quantization level such that, after quantization is completed, at least a predetermined number of quantized coefficients in a block will have the predetermined value.

QLGQ unit 204 outputs each block-specific Q-level to the block Q-level store 216. In the present embodiment, block Q-level store 216 is a First-In-First-Out (FIFO) memory that ensures that the Q-levels are provided to the decoder 106 in the same order that they are generated by encoder 104. Thus, block Q-level store 216 ensures that Q-levels are matched with their associated blocks in the decoder 106 during decoding. While the inventors have had good success using a FIFO as the block Q-level store 216, in part due to its simplicity of implementation, other types of memory (e.g., addressable memories, etc.) may be used with the present invention so long as the block-specific Q-levels can be matched with the corresponding data during decoding.

QLGQ unit 204 also quantizes each DCT coefficient based on predetermined quantization data (e.g., an 8-by-8 table of quantization values, a fixed quantization value for all DCT coefficients, etc.) and the block-specific Q-level to produce a block of quantized coefficients, which will be described in more detail in FIG. 3.

Once a block of data is quantized, QLGQ unit 204 provides the block of quantized coefficients to the zig-zag unit 208. The zig-zag unit 208 receives the 8-by-8 block of quantized coefficients and performs a "zig-zag" operation on the block. The zig-zag operation arranges the block of quantized coefficients into a linear sequence by "zig-zagging" along the diagonals of the block. This linear sequence is then output to the run-length encoder 210.

Run-length encoder 210 receives the linear sequence of quantized coefficients from zig-zag unit 208 and encodes the linear sequence into run-length-encoded (RLE) data. Run-length encoding is a form of data compression in which runs of data having the same value (e.g., zero) are stored as a count. A particular method for run-length encoding stores the plurality of quantized coefficients of a block as RLE data including pairs of values each having a first value defining a run of zeros and a second value indicating the next non-zero quantized coefficient. The RLE data also includes an end-of-block code which indicates that all remaining quantized coefficients associated with the block are zero. Once the RLE data is generated, it is output to entropy encoder 212.

Entropy encoder 212 receives the RLE data and performs an entropy encoding process on it, whereby frequently-occurring RLE data is encoded using shorter codes and infrequently-occurring RLE data is encoded using longer codes. One type of entropy encoding is known as Huffman encoding. Once the RLE data is entropy encoded, entropy encoder 212 outputs the encoded data as a compressed data stream. As indicated above, the compressed data stream can be stored in compressed data store 113 before being provided to the decoder 106.

FIG. 2 also shows timing control unit 220 providing timing (e.g., a clock, etc.) and, optionally, other control signals to encoder 104, block Q-level store 216, compressed data store 113, and block preparation unit 214 via one or more timing control paths 222. Optionally, timing control unit 220 is a common component with host device 102. The timing and other control signals (e.g., clock pulses, enable signals, reset signals, etc.) provided by timing control unit 220 enable encoder 104 to carry out its intended functions and to move data through encoder 104 at the appropriate times.

Figure 3:
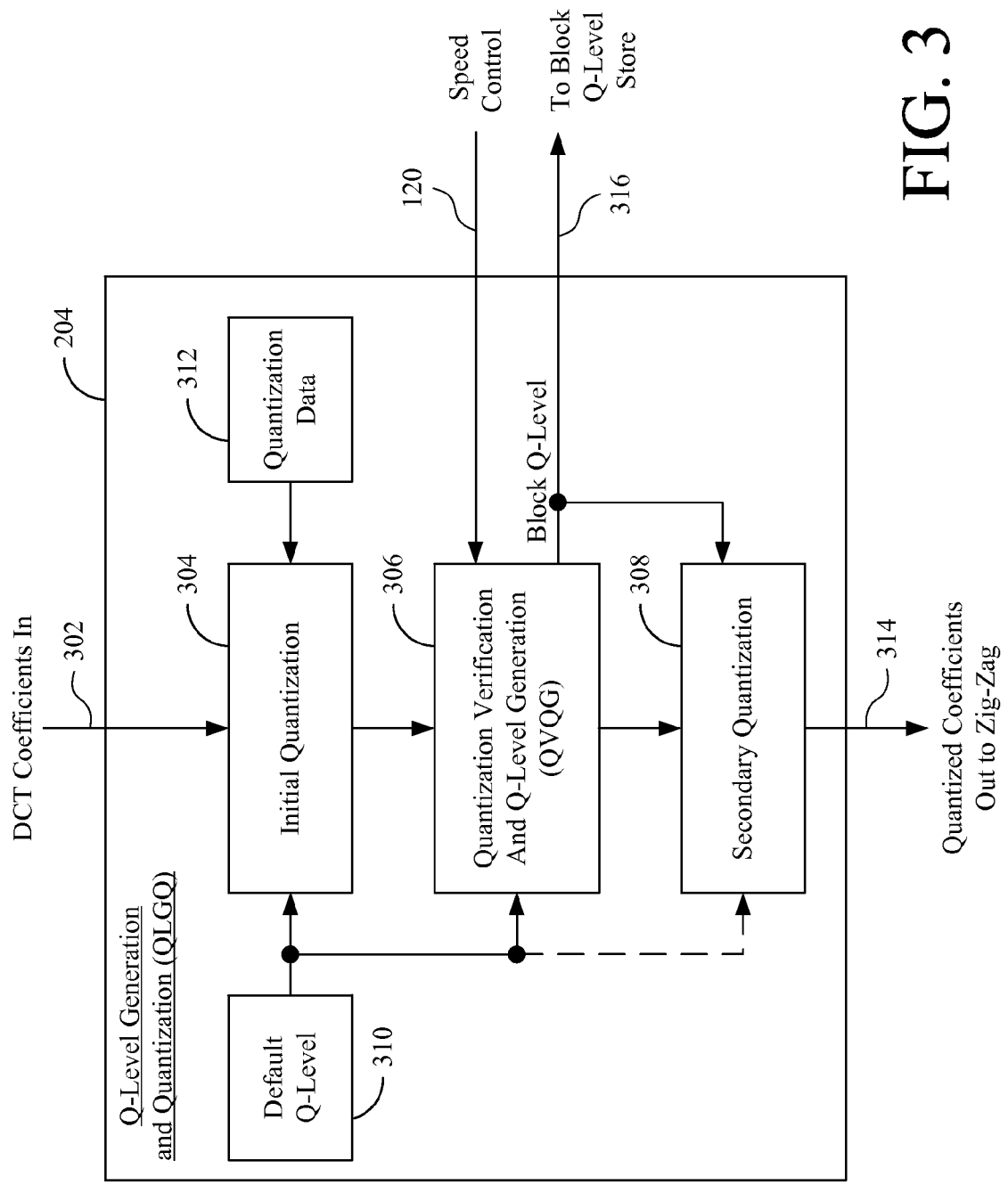
FIG. 3 is a block diagram showing the Q-level generator and quantization unit of the encoder of FIG. 2 in greater detail.

FIG. 3 is a block diagram showing QLGQ unit 204 (FIG. 2) of encoder 104 in greater detail. QLGQ 204 includes an input 302, an initial quantization unit 304, a quantization verification and Q-level generation (QVQG) unit 306, a secondary quantization unit 308, a default Q-level memory 310 storing at least one default Q-level, a quantization data memory 312 storing quantization data, a quantized coefficient output 314, and a block Q-level output 316. Additionally, QVQG unit 306 is coupled to accept speed control signals via speed control input 120. In the present embodiment, the quantization data comprises an 8-by-8 table of quantization values, where each quantization value is used to quantize a corresponding DCT coefficient in the block. Also in the present embodiment, the default Q-level is the value one (1) for each block, which provides particular advantages as described below.

Initial quantization unit 304 is coupled to receive a block of DCT coefficients via input 302, quantization data from quantization data memory 312, and a default Q-level from default Q-level memory 310. Responsive to these inputs, initial quantization unit 304 quantizes the block of transform coefficients according to the quantization data and the default Q-level to generate a test block of quantized coefficients. Initial quantization unit 304 quantizes each DCT coefficient in the block according to the formula:

$$T_i = \text{round}((DCT_i)/(q_i * \text{Default\_Q-level})),$$

where $T_i$ represents the value of the resulting quantized coefficient in the test block, $DCT_i$ represents the value of the DCT coefficient being quantized, $q_i$ represents the quantization value used to quantize the corresponding DCT coefficient, Default_Q_level represents the default Q-level, and round is the round function, which rounds a decimal value to the nearest integer. When initial quantization unit 304 finishes quantizing the block of DCT coefficients, unit 304 outputs the test block of quantized coefficients to QVQG unit 306.

It should be noted that the quantization data used by initial quantization unit 304 can change periodically (e.g., once per frame, based on instructions from host device 102, based on the image data, etc.). For example, quantization data memory 312 may include multiple quantization tables that are selected for use according to the circumstances and/or the quantization data in quantization data memory 312 may be re-written as needed with different quantization data. Accordingly, changing the quantization data used during quantization is within the scope of present invention. Similarly, periodically changing the value of the default Q-level used during quantization is also within the scope of the present invention.

QVQG unit 306 receives the test block of quantized coefficients from initial quantization unit 304, the speed control signal via input 120, and the default Q-level from default Q-level memory 310. QVQG unit 306 then determines if the test block has at least a predetermined number (k) of quantized coefficients having a value of zero. In a particular embodiment, QVQG unit 306 determines the $k^{th}$ smallest quantized coefficient in the test block. If the $k^{th}$ smallest quantized coefficient in the test block equals zero, then the default Q-level is sufficient to ensure that the data will be compressed enough and the decoder 106 will operate at the desired speed. In such a case, QVQG unit 306 retrieves the default Q-level and outputs it to the block Q-level store 216 via output 316 as the block-specific Q-level.

However, if the test block does not include (k) coefficients with a value of zero, then QVQC unit 306 generates a new Q-level for the block. Continuing the prior example, if the $k^{th}$ smallest quantized coefficient in the test block does not equal zero, then QVQG module 306 determines a new Q-level for the test block that will yield at least (k) quantized coefficients having a value of zero. For example, a new Q-level (New_Q-level) for the test block can be calculated as follows:

New_Q-level=$(2*T_k)+1$, where $T_k$ represents the value of the $k^{th}$ smallest quantized coefficient in the test block. Once the new Q-level is generated, QVQG module outputs the new Q-level on output 316 as the block-specific Q-level.

The inventor has found that Q-levels can be represented with multi-bit data for JPEG codecs using the block-specific Q-level generation process described above. However, other methods for generating and representing the block-specific Q-levels can be employed as desired.

The value of (k) used by QVQG unit 306 to determine the Q-level for a block can be controlled by the host device 102 via a signal provided on speed control input 120. For example, a first speed control signal might set (k) to 32 (e.g., at least half ($32/64$) of the quantized coefficients in the block are zero), whereas a subsequent speed control signal might set (k) to 43 (e.g., at least two-thirds ($43/64$) of the quantized coefficients in the block are zero). Because many values of (k) are possible, the speed control signal can be a multi-bit signal that uniquely identifies the different (k) values used by QVQG unit 306. Moreover, the speed control input 120 permits the amount of data compression and the decoder speed to be dynamically adjusted.

Controlling the predetermined number (k) controls the amount of data compression and the speed of the decoder 106 because the amount of data compression and the throughputs of the entropy and run-length decoding sections of the decoder 106 are proportional to the value of k. Accordingly, when the value of k is smaller (fewer zero coefficients), the block of quantized coefficients will have more non-zero values (less data compression) and the entropy and run-length decoding processes will take longer. Conversely, when the value of k is larger (more zero coefficients and more data compression), the block of quantized coefficients will have fewer non-zero values and the entropy and run-length decoding processes will be shorter. Because the throughputs of the entropy- and run-length decoding sections can be predictably multiplied, the invention also makes it possible to decode data in parallel.

Following quantization verification and Q-level generation, secondary quantization unit 308 receives the test block and the block-specific Q-level from QVQG unit 306 and performs a second quantization process on the test block using the block-specific Q-level. Secondary quantization unit 308 quantizes each coefficient in the test block as follows:

$Q_i$=round($T_i$/Block_Q-level), where Qi represents the value of the quantized coefficient in the a resulting block of quantized coefficients and Block_Q-level represents the block-specific Q-level output by QVQG 306 on block Q-level output 316. Secondary quantization unit 308 performs secondary quantization on each coefficient in the test block, and outputs a resulting block of quantized coefficients on quantized coefficient output 314.

In an optional embodiment, secondary quantization unit 308 can also receive the default Q-level and compare it to the block-specific Q-level output by QVQG unit 306. In the case that the Q-level output by QVQG unit 306 and the default Q-level are the same, then secondary quantization unit 308 can forgo the secondary quantization process by outputting the test block of quantized coefficients directly to zig-zag unit 208. Doing so would save cycles associated with the secondary quantization process and speed up encoding. As yet another option, initial quantization unit 304 and secondary quantization unit 308 can be combined into a single quantizer, facilitating the functions of each of units 304 and 308.

As indicated above, setting the value of the default Q-level to one (1) provides particular advantages. For example, a default Q-level of one enables the same New_Q-Level value to be output to both block Q-level store 216 and to the secondary quantization process 308 when the New_Q-level is generated. However, if the default Q-Level is greater than one and a New Q-level was generated, different values would be provided to secondary quantization unit 308 and to block Q-level store 216. For instance, because the test block was initially quantized based on the default Q-level, the secondary quantization unit 308 would only need the value New_Q-level to complete quantization of the test block. However, the product of Default_Q-level and New_Q-level would be needed during dequantization in the decoder 106 and, therefore, this product would be output on block Q-level output 316 to be stored in the block Q-level store 216. Therefore, in the case that the default Q-level is greater than one, QVQG 308 could include two outputs: one to provide the New Q-level to secondary quantization unit 308 and another to provide the product of Default_Q-Level and New_Q-level to block Q-level store 216 via output 316. Thus, setting the default Q-level to one streamlines the operation of QLGQ 204 and reduces system complexity.

The above embodiments and processes are described to give a thorough understanding of the operation of QLGQ unit 204. However, modifications to QLGQ unit 204 are possible while still preserving the primary functions of QLGQ unit 204. Those primary functions include (1) generating a block-specific Q-level for each block of data such that, following quantization, the quantized block will have at least (k) coefficients of a predetermined value, and (2) to quantize each block of data based on the block-specific Q-level. As one example, an alternative QLGQ unit 204 might first quantize a block of DCT coefficients using a default Q-level and quantization data into a test block, and then analyze the test block. If the test block did not contain at least (k) coefficients with the predetermined value, then a new Q-level could be determined (e.g., by a process described above or some other process). The alternative QLGQ unit 204 could then requantize the block of DCT coefficients using the new Q-level and the quantization data to generate the final block of quantized coefficients. The alternative QLGQ unit 204 could then output either the default Q-level or the new Q-level as the block-specific Q-level. As yet another example, different modules of QLGQ unit 204 (e.g., the initial and secondary quantization units and the QVQG unit) can be divided into separate units, combined, etc. As still another example, QLGQ unit 204 can be used to quantize any block of values in any encoder employing quantization, not just in an encoder quantizing transform coefficients. Indeed, these and other modifications to QLGQ unit 204 are possible.

As discussed above, QLGQ unit 204 outputs a block-specific Q-level for each block of image data that is encoded, whether that Q-level corresponds to the default Q-level in default Q-level memory 310 or a different Q-level. While it would be possible to output only the non-default Q-levels to block Q-level store 216, the inventor has found that doing so adds complexity. For example, if the default Q-level was used to encode a block but was not output to the decoder 106, then codec 100 would need some means (e.g., a unique identifier associated with a block and a Q-level, etc.) to associate the particular block with its respective Q-level in the decoder 106.

Controlling the number of zeros in each block of quantized coefficients using a block-specific Q-level provides important advantages. First, controlling the number of zeros in each block controls the amount of data compression that the block (and thus the complete image) undergoes. Therefore, the value (k) can be chosen to ensure that an image is compressed enough that it can be stored in a buffer (e.g., a frame buffer) having a predetermined size. Thus, compressed data store 113 can be made smaller, which saves circuitry space and cost.

Controlling the amount of data compression for each block also maintains the bit rate output by the encoder within a desired range before the decoding process is begun. Therefore, the decoder 106 does not become overloaded, image data is not lost, and the encoding process does not have to be adjusted in response to inadequate decoder throughput.

Still another advantage of controlling the quantization process according to the invention is that it permits the encoder 104 to control the speed of the decoder 106. Because the decoder speed is proportional to (k), the encoder 104 can dynamically increase or decrease the throughput of the decoder 106 by adjusting (k). For example, the encoder 104 might increase (k) for high throughput to generate many thumbnail images in a short time. Conversely, encoder 104 might decrease (k) for lower throughput when decoded image quality is most important.

FIGS. 4A-4D show exemplary blocks of quantized coefficients 400(A)-400(D) that could be generated by QLGQ unit 204 based on different values of (k).

FIG. 4A shows an exemplary block 400A of quantized coefficients for the case (k) equals at least thirty-two (32). As such, block 400A includes at least 32 coefficients that are zero and no more than 32 coefficients that are non-zero (noted by an "x" in FIG. 4A). Therefore, block 400A was generated using a Q-level that produced at least 32 zeros following quantization. As will be described in more detail below, decoder 106 provides improved entropy and run-length decoding because no more than half of the coefficients in block 400A are non-zero. Accordingly, the entropy and run-length decoding sections of decoder 106 will decode data associated with block 400A approximately twice as fast as if every quantized coefficient in block 400A was non-zero. Additionally, this value of (k) results in approximately twice the data compression than if every quantized coefficient in block 400A was non-zero.

FIG. 4B shows an exemplary block 400B of quantized coefficients for the case (k) equals at least forty-three (43). As such, block 400B includes at least 43 coefficients that are zero and no more than 21 coefficients that are non-zero (noted by an "x" in FIG. 4B). Therefore, block 400B was generated using a Q-level that produced at least 43 zeros following quantization. Because approximately one-third of the values in block 400B are non-zero, the entropy and run-length decoding sections of decoder 106 will decode data associated with block 400B approximately three times faster than if every quantized coefficient in block 400B was non-zero. Additionally, this value of (k) results in approximately three times the data compression than if every quantized coefficient in block 400B was non-zero.

FIG. 4C shows an exemplary block 400C of quantized coefficients for the case (k) equals at least forty-eight (48). As such, block 400C includes at least 48 coefficients that are zero and no more than 16 non-zero coefficients (noted by an "x" in FIG. 4C). Therefore, block 400C was generated using a Q-level that produced at least 48 zeros following quantization. Because no more than one-fourth of the values in block 400C can have a non-zero value, the entropy and run-length decoding sections of decoder 106 will decode data associated with block 400C approximately four times faster than if every quantized coefficient in block 400C was non-zero. The entropy and run-length decoding sections will also decode block 400C approximately twice as fast as block 400A because block 400C has half the number of non-zero values as block 400A. Additionally, this value of (k) results in approximately four times the data compression than if every quantized coefficient in block 400C was non-zero.

FIG. 4D shows an exemplary block 400D of quantized coefficients for the case (k) equals at least fifty-two (52). As such, block 400D includes at least 52 zero coefficients and at most 12 non-zero coefficients (denoted as "x0-x11" in FIG. 4D). Therefore, block 400D was generated using a Q-level that produced at least 52 zeros following quantization. Because approximately one-fifth of the values in block 400D can have a non-zero value, the entropy and run-length decoding sections of decoder 106 will decode data associated with block 400D approximately five times faster than if every quantized coefficient in block 400D was non-zero. Additionally, this value of (k) results in approximately five times the data compression than if every quantized coefficient in block 400D was non-zero.

In summary, FIGS. 4A-4D show how the speed of the decoder 106 can be increased by increasing the number of the zero coefficients generated during quantization, i.e., by increasing the value of (k). FIGS. 4A-4D further illustrate that the amount of data compression by encoder 104 is proportional to the value of (k). While particular values for (k) are illustrated in FIGS. 4A-4D, any value of (k) can be employed depending on the desired amount of data compression and/or decoder speed. For example, a (k) value can be selected that yields approximately one-and-one-half times the data compression and decoder throughput.

While increasing the value of (k) has the advantage of increasing the speed of the decoder 106, it also has the disadvantage that progressively higher (k) values will progressively lower decoded image quality. As those skilled in the art will understand, quantization is a lossy data compression process. Therefore, higher (k) values will cause more image data to be lost as more coefficients are quantized to zero. Accordingly, the desired quality of the decoded image data should also be considered when selecting the (k) value.

If high decoded image quality and high decoding speed are necessitated by an application, then multiple iterations of codec 100 can be implemented in host device 102. Furthermore, because each compressed data stream would be associated with a decoder 106 having (n) decoding channels, throughput is increased while minimizing the amount of additional circuitry integrated into the host device 102.

Now, FIG. 4D will be used as an example to describe the zig-zag, run-length-encoding, and entropy-encoding processes in greater detail. In particular, when zig-zag unit 208 receives a block of quantized coefficients, zig-zag unit 208 arranges the quantized coefficients in a linear manner by zig-zagging along the diagonals of the block as shown by the arrows in FIG. 4D. In the specific case of block 400D, zig-zag unit 208 would output the following sequence of quantized coefficients: x0, x1, x2, 0, x3, x4, 0, x5, x6, x7, x8, x9, 0, 0, 0, x10, 0, x11, 0, 0, . . . 0.

This sequence of quantized coefficients would then be provided to run-length encoder 210 and undergo run-length encoding. According to this particular embodiment, run-length encoder 210 encodes the quantized coefficients and outputs the following run-length data to entropy encoder 212:

(0, x0)
(0, x1)
(0, x2)
(1, x3)
(0, x4)
(1, x5)
(0, x6)
(0, x7)
(0, x8)
(0, x9)
(3, x10)
(1, x11)
(E.O.B.).

Each pair of values of the RLE data includes a first value that defines a run-length of zeros from the previous non-zero quantized coefficient or from the start of coefficients for the block, as well as a second value that defines the next non-zero quantized coefficient. For example, because there are no zeros between non-zero coefficients x0 and x1 (according to the zig-zag process), the RLE data for the coefficients after x0 up to, and including, x1 can be defined as (0, x1). Similarly, because there are three zeros between the non-zero coefficients x9 and x10, the RLE data for the quantized coefficients after x9 up to, and including, x10 can be represented as (3, x10). The last element in the RLE data is an end-of-block (E.O.B.) code that is used to indicate that all remaining quantized coefficients in the block are zero.

The RLE data output by run-length encoder 210 is provided to entropy encoder 212, where it undergoes entropy encoding. As explained above, entropy encoding is performed by assigning different codes to different data values. In the present embodiment, entropy encoder 212 receives each pair of RLE data and looks up an associated entropy code (e.g., in a look-up table). Entropy encoder 212 then outputs the entropy codes in the compressed data stream as entropy-encoded data.

Controlling the quantization process improves data compression in compressed data output by the encoder, because as (k) increases, the number of run-length pairs and entropy codes will decrease. For example, FIGS. 4A-4D show that fewer run-length pairs are needed to encode a block of quantized coefficients as (k) increases. Fewer run-length pairs, in turn, means that fewer entropy codes are needed to represent the run-length data associated with each block. Therefore, present invention improves data compression over the prior art. Additionally, the present invention controls the amount of data compression based on the value (k).

Finally, it should be noted that different zig-zag, run-length-, and entropy-encoding methods can be used in place of the specific examples provided above.

Figure 5:
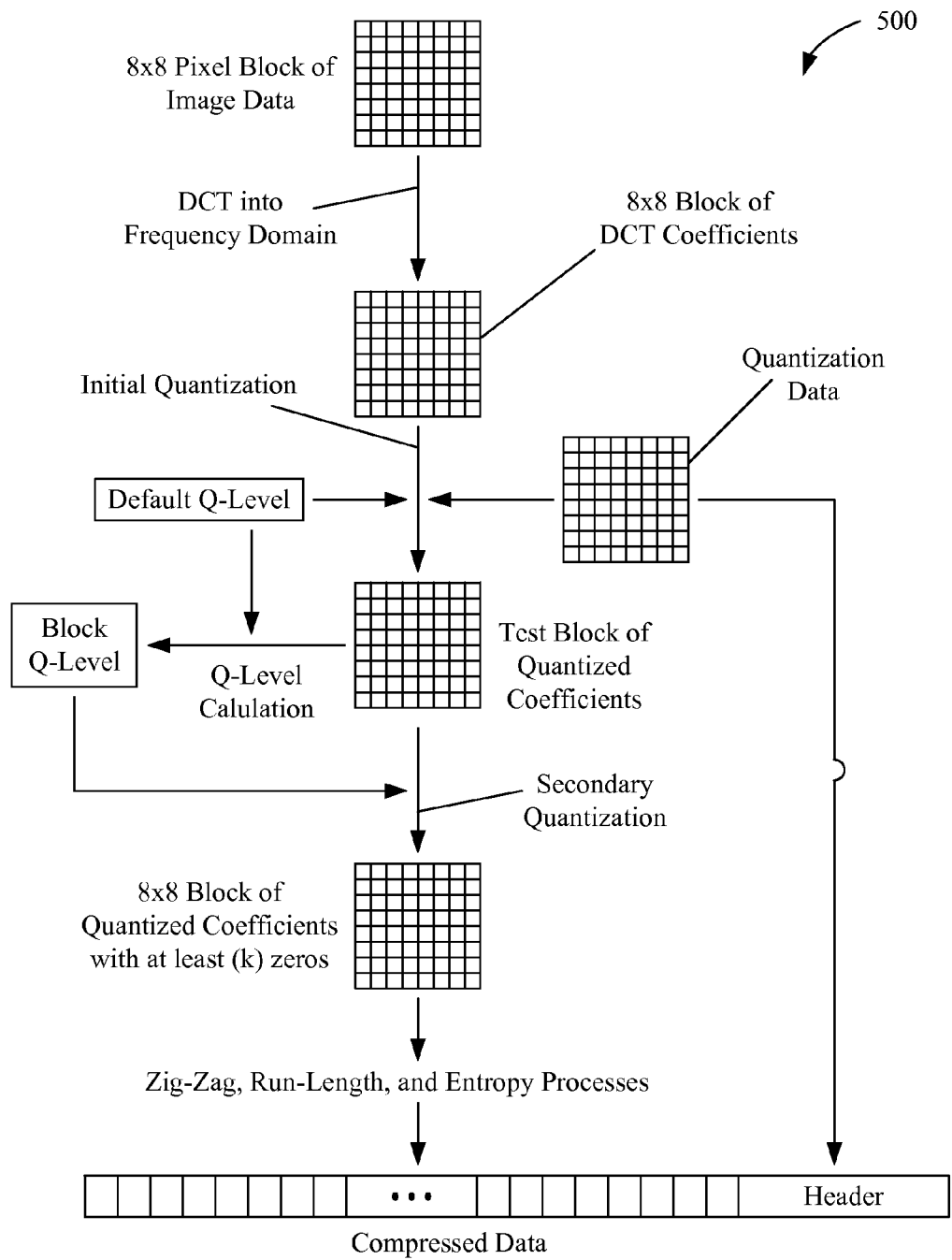
FIG. 5 is a data flow diagram for the encoding process used by the encoder of FIG. 2.

FIG. 5 is a data flow diagram 500 for each block of data flowing through encoder 104 for a JPEG encoding process. As shown, an 8-by-8 block of image data associated with a plurality of pixels is received by encoder 104. Then, a DCT is performed on the block of image data to produce an 8-by-8 block of DCT coefficients. The block of DCT coefficients then undergoes an initial quantization process, which uses a default Q-level (e.g., a value of one) and a quantization data table to quantize the block of DCT coefficients into a test block of quantized coefficients. The test-block of quantized coefficients then undergoes a Q-level generation process to define a Q-level specific to the block such that, following quantization, a predetermined number (k) of the quantized coefficients will have a predetermined value (e.g., zero). The test block of quantized coefficients and the block Q-level are then passed to a secondary quantization process to produce a block of quantized coefficients with at least (k) zeros. The block of quantized coefficients then undergoes a zig-zag process to produce a sequential data stream. The sequential data stream is then run-length encoded to produce RLE data, and the RLE data is then entropy encoded to produce the compressed data stream. The compressed data stream is then output to storage and/or to the decoder 106.

As indicated in FIG. 5, the compressed, encoded data stream includes header information that is embedded in the data stream during the encoding process. Such header information can include the quantization data used during the quantization process as well as look-up tables used during the entropy encoding process. Additionally, the header information in the compressed data stream can be updated periodically with new information, for example, once per frame.

Figure 6:
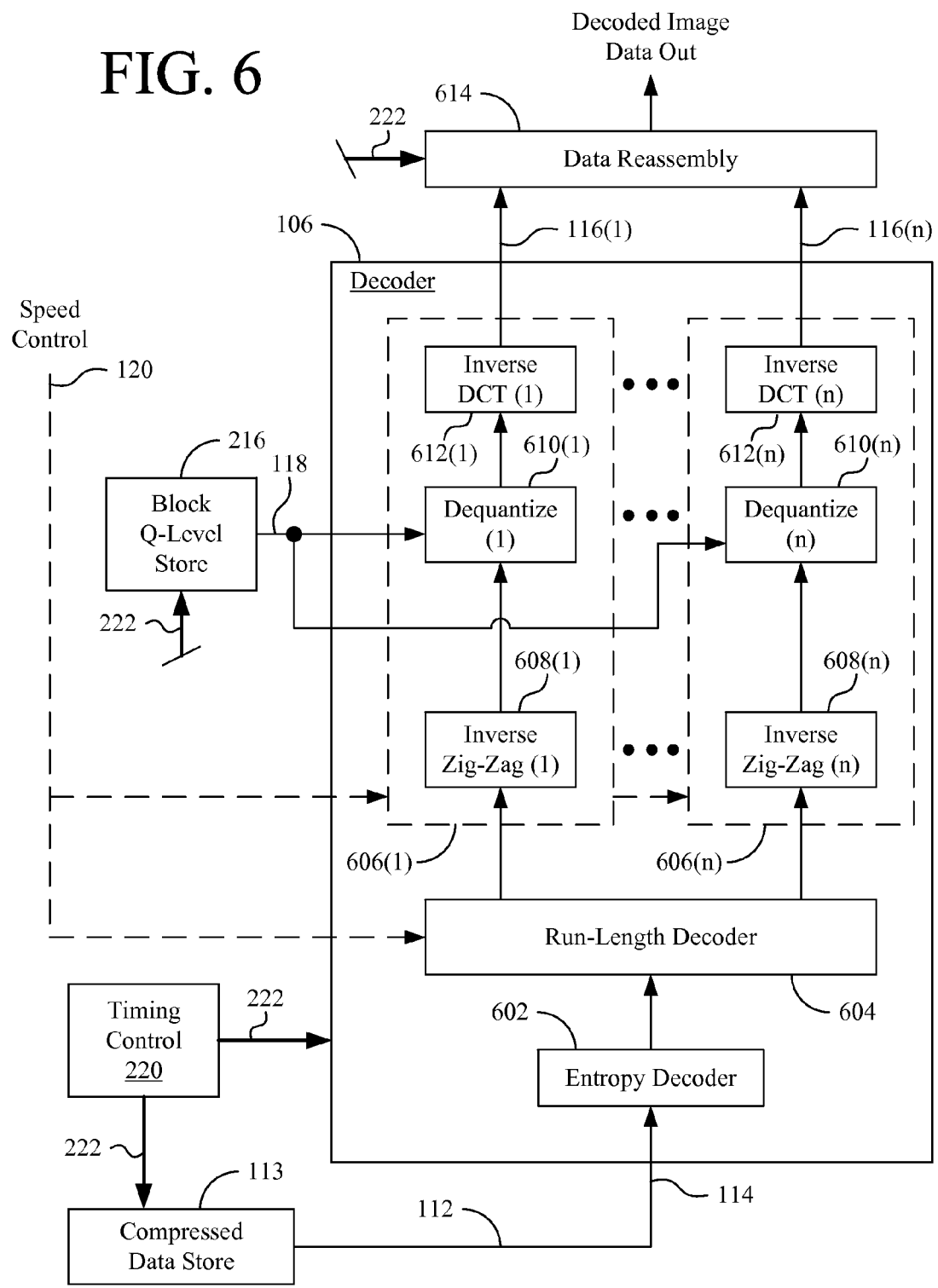
FIG. 6 is a block diagram showing the decoder of FIG. 1 in greater detail.

FIG. 6 is a block diagram showing decoder 106 of codec 100 in greater detail. Decoder 106 further includes an entropy decoder 602, a run-length decoder 604, and a plurality of decoding channels 606(1)-606($n$) operating in parallel and each coupled to a respective one of outputs 116(1)-116($n$). Each decoding channel 606(1)-606($n$) includes a respective inverse zig-zag unit 608(1)-608($n$), a dequantizer 610(1)-610($n$), and an inverse DCT unit 612(1)-612($n$). Codec 100 also includes a data reassembly unit 614, which can optionally be integrated with decoder 106.

When encoded JPEG image data needs to be decoded, it is provided to the input 114 of decoder 106 as an entropy-encoded bit stream associated with a series of blocks of image data. Entropy decoder 602 performs an inverse entropy process on the entropy-encoded data to produce RLE data associated with the series of blocks of image data.

The quantization control used during the encoding process greatly improves the speed of entropy decoder 602, and bottlenecking at the entropy decoder 602 is eliminated, or at least greatly reduced. As indicated above, the number of entropy codes needed to represent a block of data is inversely proportional to (k). Therefore, the entropy decoder 602 will have fewer table look-ups to perform as (k) increases. Stated another way, the throughput of entropy decoder 602 is proportional to (k) and, therefore, increases as (k) increases.

With reference to FIG. 4A, because block 400A includes at most 32 non-zero quantized coefficients (k≥32), there will be at most 32 run-length pairs of data (in addition to the end-of-block code). Therefore, entropy decoder 602 can decode block 400A approximately twice as fast as it could decode a block of quantized coefficients having 64 non-zero coefficients. For the same reasons, entropy decoder 602 can decode block 400B (k≥43) approximately three times faster than a block of quantized coefficients having 64 non-zero coefficients. Likewise, entropy decoder 602 can decode block 400C (k≥48) approximately four times faster than a block of quantized coefficients having 64 non-zero coefficients and approximately twice as fast as block 400A. Entropy decoder 602 can also decode block 400D (k≥52) approximately five times faster than a block of quantized coefficients having 64 non-zero coefficients.

Because the throughput of entropy decoder 602 can be increased through quantization control, decoder 106 is able to decode data in parallel using the plurality of decoding channels 606(1)-606($n$). Additionally, because the quantization process controls the amount of RLE data and entropy-encoded data that is generated, the bit rate to entropy decoder 602 is also controlled by the value (k). Therefore, the entropy decoder 602 is not over-run, data is not lost, and entropy decoder 602 does not become a bottleneck.

The RLE data output by entropy decoder 602 is then provided to run-length decoder 604, which serially decodes the RLE data to generate pluralities of quantized coefficients, where each plurality is associated with a block of image data. As indicated above, the speed of run-length decoder 604 is proportional to the number of quantized coefficients associated with a block that have a value of zero. Following run-length decoding, run-length decoder 604 outputs each plurality of quantized coefficients to one of decoder channels 606(1)-606(n) for further decoding in parallel. Thus, run-length decoder 604 is a means for serially decoding RLE data into consecutive pluralities of coefficients.

Run-length decoder 604 outputs consecutive pluralities of quantized coefficients to their respective decoding channels 606(1)-606(n) in sequential order. For example, run-length decoder 604 outputs a first plurality of quantized coefficients to decoding channel 606(1), then a second plurality of quantized coefficients to decoding channel 606(2), ... and outputs an $n^{th}$ plurality of quantized coefficients to decoding channel 606(n). However, other methods of output by run-length decoder 604 are possible. For example, each decoding channel 606(1)-606(n) could be utilized randomly. As another example, if all the decoding channels 606(1)-606(n) are not required for decoder 106 to operate at a desired speed (e.g., at the speed set by the speed control signal on input 120), then run-length decoder 604 might use only some of decoding channels 606 and not the others.

As will be apparent from the following discussion, decoding channels 606(1)-606(n) provide means for decoding pluralities of quantized coefficients in parallel. Decoding channels 606(1)-606(n) operate as follows.

Once a plurality of quantized coefficients is provided to a decoding channel 606(1)-606(n), the associated inverse zig-zag unit 608(1)-608(n) performs an inverse zig-zag process on the data to reproduce the 8-by-8 block of quantized coefficients from the encoding process. This block is then passed to the associated dequantizer 610(1)-610(n).

The dequantizer 610(1)-610(n) dequantizes the block of quantized coefficients to produce a block of DCT coefficients. In the present embodiment, the dequantizer 610(1)-610(n) dequantizes each quantized coefficient by multiplying the quantized coefficient by the product of the associated quantization data and the Q-level defined for that particular block. As indicated above, the quantization data is embedded in the header of the compressed data stream. Accordingly, the dequantizers 610(1)-610(n) can obtain the quantization data from this header. The dequantizer 610(1)-610(n) also obtains the block-specific Q-level by reading the next value from the block Q-level store 216. Because the run-length decoder 604 decodes RLE data associated with blocks of image data in the same order that the blocks were encoded and provides data to the decoding channels 606(1)-606(n) consecutively, block Q-levels retrieved from the block Q-level store 216 are advantageously synchronized with the blocks undergoing dequantization by the dequantizers 610(1)-610(n).

Following dequantization, the block of DCT coefficients is provided to the respective inverse DCT unit 612(1)-612(n). There, the block undergoes an inverse DCT process to produce a block of decoded image data, which is output from the decoder via the respective one of outputs 116(1)-116(n). Because the quantization process carried out in the encoder 104 is lossy, the block of decoded image data is not an exact reproduction of the original block of image data input into the encoder 106. As indicated above, the quality of the decoded image data will depend on the value of (k) used during the encoding process.

Optionally, the blocks of decoded image data provided on outputs 116(1)-116(n) can be recombined by data reassembly unit 614 (e.g., into an image). Because run-length decoder 604 provides pluralities of coefficients to the decoder channels 606(1)-606(n) in consecutive order, data reassembly unit 614 de-multiplexes the blocks of decoded image data on outputs 116(1)-116(n) in the same order. Additionally, data reassembly unit 614 can also convert the decoded image data from one color space (e.g., YUV, YCbCr, etc.) into another color space (e.g., RGB, etc.).

Speed control input 120 can optionally be provided as an input to one or both of run-length decoder 604 and decoding channels 606(1)-606(n) to facilitate additional functionality of decoder 106. In particular, the signal on speed control input 120 can be used to disable one or more of decoding channels 606(1)-606(n), for example, to conserve power. As indicated above, because run-length decoder 604 increases its decoding speed as (k) increases, the number of operating decoding channels 606(1)-606(n) will also increase as (k) increases. Because the speed control signal on input 120 can be associated with a value (k), the speed control signal can also define the number of decoding channels 606(1)-606(n) that should be operating at a given time to prevent bottlenecking within the decoder 106. Generally, enough decoder channels 606(1)-606(n) should be available such that run-length decoder 604 does not have to wait unreasonably long to output each plurality of quantized coefficients to the next decoder channel 606(1)-606(n). The speed control signal can also indicate to run-length decoder 604 which channels 606(1)-606(n) are currently disabled.

FIG. 6 also shows that timing control unit 220 provides timing (e.g., a clock, etc.) and, optionally, other control signals to the elements of FIG. 6 via the one or more timing control paths 222. Like encoder 104, the signals provided by timing control unit 220 enable decoder 106 to carry out its intended functions and to move data through decoder 106 at the appropriate times. Optionally, decoder 106 can includes its own timing and control system, for example, if decoder 106 and encoder 104 were not in the same host device.

Decoder 106 provides important advantages over the prior art. In particular, decoder 106 is capable of receiving a compressed data stream from a single encoder and decoding that bit stream using a plurality of decoding channels 606(1)-606(n) operating in parallel. Operating the decoding channels 606(1)-606(n) in parallel is facilitated by the faster entropy decoder 602 and the faster run-length decoder 604, which are capable of supplying two or more decoding channels 606(1)-606(n) with sufficient amounts of data. Thus, decoder 106 improves throughput over the prior art, which is especially important in HD media applications. Moreover, because only the decoding channels 606(1)-606(n) are replicated in integrated circuitry, decoder 106 increases data throughput over the prior art while minimizing the amount of additional circuitry needed to do so.

Figure 7:
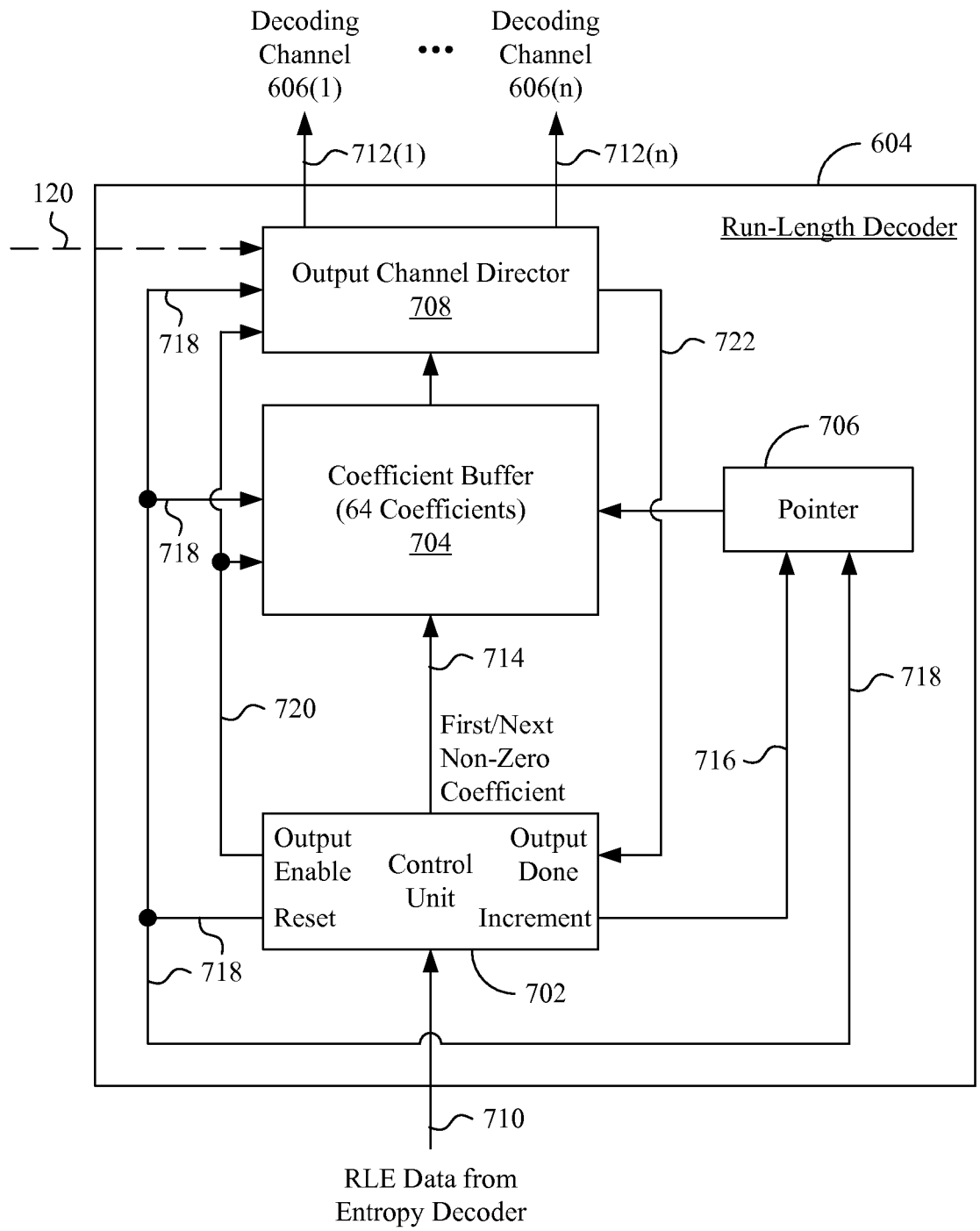
FIG. 7 is a block diagram showing the run-length decoder portion of the decoder of FIG. 6 in greater detail.

FIG. 7 is a block diagram showing run-length decoder 604 of decoder 106 in greater detail. In the embodiment shown, run-length decoder 604 includes a control unit 702, a coefficient buffer 704, a pointer 706, and an output channel director 708. Run-length decoder 604 also includes an input 710, which receives RLE data from entropy decoder 602, and a plurality of outputs 712(1)-712(n), each for outputting coefficients to a respective one of decoding channels 606(1)-606(n).

Control unit 702 controls and coordinates the overall decoding and input/output (I/O) processes of run-length decoder 604. Control unit 702 receives RLE data from entropy decoder 602 via input 710 and performs various functions. In particular, control unit 702 stores non-zero, quantized coefficients defined by the RLE data in coefficient buffer 704 via a coefficient path 714. Control unit 702 also changes, based on run-lengths in the RLE data pairs, the location pointed to by pointer 706 by asserting signals on a pointer control path 716. Additionally, control unit 702 generates and outputs reset signals via a reset path 718, which provides the reset signals to coefficient buffer 704, pointer 706, and output channel director 708. Control unit 702 also coordinates the output of data on outputs 712(1)-712(n) by asserting output enable signals on an output control path 720. Control unit 702 will generate an output enable signal when it knows that RLE data associated with a block of data has finished decoding, for example, when it encounters an end-of-block code in the RLE data stream. Control unit 702 also receives an output done signal via path 722 each time output channel director 708 finishes outputting a plurality of coefficients from coefficient buffer 704 to one of decoding channels 606(1)-606(n).

Quantized coefficient buffer 704 includes a number of consecutively-accessible buffer locations equal to the number of coefficients in a block of data. For JPEG, coefficient buffer 704 includes sixty-four (64) storage locations (FIG. 8B) because there are 64 quantized coefficients associated with each block of image data. Responsive to a reset signal on reset path 718, coefficient buffer 704 resets each of its storage locations to the predetermined value zero. Then, as coefficient buffer 704 receives non-zero coefficients on coefficient path 714, coefficient buffer 704 stores each non-zero coefficient to the storage location indicated by pointer 706. When coefficient buffer 704 receives an output enable signal from control unit 702 on output control path 720, coefficient buffer 704 serially outputs its entire contents in order of storage location to output channel director 708.

Pointer 706 is operative to selectively point to any one of the plurality of storage locations in coefficient buffer 704. Upon receiving a reset signal on reset path 718, pointer 706 resets itself to point to the first storage location in coefficient buffer 704. Upon control signal(s) from control unit 702 on pointer control path 716, pointer 706 moves to point to a new storage location in coefficient buffer 704. The control signal(s) provided by control unit 702 on path 716 might be a series of increment signals that cause pointer 706 to move a number of storage locations equal to the number of increment signals it receives. Alternatively, control unit 702 can provide a jump signal to pointer 706 indicating a number of consecutive storage locations for pointer 706 to "jump" over in coefficient buffer 704. Indeed, control unit 702 can move pointer 706 in various ways.

Output channel director 708 selectively provides the contents of coefficient buffer 704 to one of decoding channels 606(1)-606(n) via a respective one of outputs 712(1)-712(n). Responsive to an output enable signal from control unit 702 on output control path 720, output channel director 708 serially outputs each coefficient from coefficient buffer 704 to one of decoding channels 606(1)-606(n). When the last quantized coefficient has been output, output channel director 708 provides a signal via path 722 to control unit 702 to indicate that the output is complete. Responsive to a reset signal on reset path 718, output channel director selects a next output 712(1)-712(n), which will be used to output the next plurality of coefficients decoded by run-length decoder 604. In the present embodiment, output channel director 708 selects outputs 712(1)-712(n) in a particular order (e.g., sequential order). However, as indicated above, output channel director 708 can optionally be responsive to the speed control signal 120 to skip certain ones of outputs 712(1)-712(n).

In the present embodiment, control unit 702 generates a reset signal after RLE data associated with a block is finished run-length decoding and the coefficients in coefficient buffer 704 have been output via one of outputs 712(1)-712(n). In the current embodiment, output channel director 708 indicates to control unit 702 via path 722 when all the coefficients in coefficient buffer 704 have been read out. Thereafter, control unit 702 generates a reset signal on reset path 718 knowing that it is safe to reset coefficient buffer 704.

The operation of run-length decoder 604 will now be described with respect to FIGS. 8A and 8B using the RLE data associated with block 400D of FIG. 4D as an example.

FIG. 8A shows table 800 including a plurality of rows 802(0)-802(12) and a plurality of columns 804, 806, 808, and 810. Each of rows 802(0)-802(12) associates a respective portion of RLE data contained in column 804 with the information in the other columns 806, 808, and 810. Column 804 defines the RLE data for block 400D of FIG. 4D, which includes pair values in rows 802(0)-802(11) and an end-of-block (E.O.B.) code in row 802(12).

Each of the values in column 806 indicates how many storage locations the pointer 706 is increased by based on run-length information in the RLE data in the corresponding rows 802(0)-802(11). A pointer increase is not applicable for the end-of-block code (E.O.B.) because it indicates that all remaining coefficients are zero and all storage locations of coefficient buffer 704 have been pre-loaded with zeros. As will be apparent from the table, the pointer increases in column 806 associated with rows 802(0)-802(11) are based on the run-lengths defined in the corresponding pairs of values. In the embodiment shown, the pointer 706 is increased by a number of storage locations equal to one plus the run-length defined in the corresponding RLE pair of values for all but the first RLE pair of values (i.e., for rows 802(1)-802(11)). For the first RLE pair of values in row 802(0), the pointer is increased by a number of storage locations equal to the run-length defined in the first RLE pair.

Column 808 indicates the storage locations in coefficient buffer 704 that are progressively pointed to by pointer 706 each time it is increased by the associated amount in column 806. In other words, the non-zero coefficients x0-x11 shown in rows 802(0)-802(11) will be written to the storage locations in coefficient buffer 704 indicated in column 808.

Finally, each of the values in column 810 indicates a non-zero coefficient that is written to the storage location indicated in column 808 of the associated row 802. The non-zero coefficients in column 810 are obtained from the RLE data in column 804. Note that there is no applicable information in Columns 808 and 810 for the end-of-block code in row 802 (12) because there are no more non-zero coefficients and the pointer 706 does not need to be moved further until a reset occurs by control unit 702.

Figure 8B:
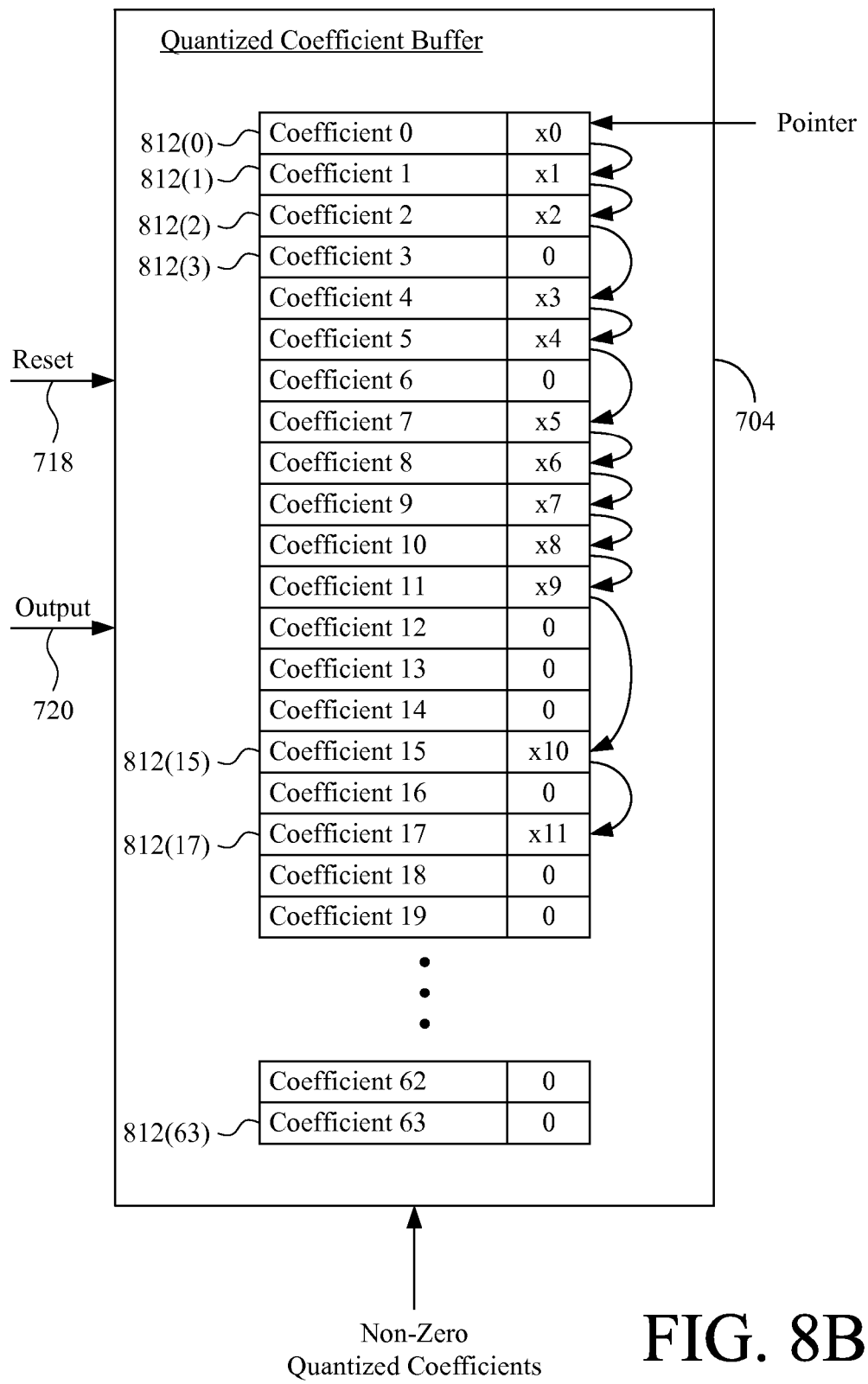
FIG. 8B shows the quantized coefficient buffer of FIG. 7 in greater detail.

FIG. 8B shows coefficient buffer 704 in greater detail to include sixty-four (64) consecutively-accessed storage locations 812(0)-812(63). FIG. 8B also graphically explains how the RLE data in column 804 is decoded into the plurality of quantized coefficients of block 400D.

Initially, responsive to a reset signal asserted on reset path 718 by control unit 702, zeros are stored in all of storage locations 812(0)-812(63). Additionally, pointer 706 is reset to point to the first storage location 812(0) in coefficient buffer 704. Thereafter, control unit 702 receives the first RLE data pair (0, x0) and writes x0 to storage location 812(0) via coefficient path 714, because there are no zeros before x0 (the first value in the pair is "0") and pointer 706 is pointing to storage location 812(0). Next, control unit 702 sequentially processes the RLE pair values shown in rows 802(1)-802(11)

in column 804. First, the RLE data in row 802(1) indicates that there are no zeros between x0 and x1 (the first value in the pair is "0") and that x1 (the second value in the pair) is the next non-zero quantized coefficient. Thus, control unit 702 increases pointer 706 by one plus the run-length (an increase of one location in this case) by asserting control signal(s) on pointer control path 716. Thereafter, pointer 706 points to storage location 812(1), and control unit 702 writes x1 to storage location 812(1) via coefficient path 714. Next, control unit 702 processes the RLE pair value shown in row 802(2). The RLE data in row 802(2) indicates that there are no zeros between x1 and x2 (the first value in the pair is "0") and that x2 (the second value in the pair) is the next non-zero quantized coefficient. Thus, control unit 702 increases pointer 706 by one plus the run-length (an increase of one location in this case) by asserting control signal(s) on pointer control path 716. Thereafter, pointer 706 points to storage location 812(2), and control unit 702 writes x2 to storage location 812(2) via coefficient path 714. This process continues similarly for the remaining pair values in rows 802(3)-802(9) of table 800.

When control unit 702 encounters the RLE data in row 802(10), the pair value indicates that there are three zeros between x9 and x10 (the first value in the pair is "3") and that x10 (the second value in the pair) is the next non-zero coefficient. Thus, control unit 702 increases pointer 706 by one plus the run-length (an increase of four locations in this case) by asserting control signal(s) on pointer control path 716. Thereafter, pointer 706 points to storage location 812(15), and control unit 702 writes x10 to storage location 812(15) via coefficient path 714. Next, the RLE data in row 802(11) indicates that there is one zero between x10 and x11 (the first value in the pair is "1") and that x11 (the second value in the pair) is the next non-zero coefficient. Thus, control unit 702 increases pointer 706 by one plus the run-length (an increase of two locations in this case) by asserting control signal(s) on pointer control path 716. Thereafter, pointer 706 points to storage location 812(17), and control unit 702 writes x11 to storage location 812(17) via coefficient path 714.

After receiving the RLE data in row 802(11), control unit 702 receives the end-of-block code that indicates that all the remaining quantized coefficients associated with the current block of image data have a value of zero. When control unit 702 reaches this code, it has finished decoding the RLE data into a plurality of quantized coefficients associated with the block of image data. Control unit 702 can then proceed to cause the 64 coefficients in coefficient buffer 704 to be output to output channel director 708, for example, by asserting an output enable signal on output control path 720.

Loading the coefficient buffer 704 with all zeros prior to decoding the RLE data associated with each block of image data provides particular advantages. Specifically, because all the quantized coefficients having a value of zero are pre-loaded, run-length decoder 604 does not need to expend time and resources decoding these coefficients. Rather, run-length decoder 604 only uses time and resources to decode RLE data associated with non-zero coefficients. As indicated in column 804 of table 800, block 400D only includes twelve (12) non-zero coefficients, which means that run-length decoder 604 can decode block 400D approximately five times faster than if it had to individually decode each of the 64 coefficients in block 400D. In other words, run-length decoder 604 has five times the throughput of prior art run-length decoders. The decoding channels 606(1)-606(n) take advantage of this increased speed of run-length decoder 604 by completing the decoding process on blocks of data in parallel.

Furthermore, because the throughputs of the entropy decoder 602 and the run-length decoder 604 are both proportional to the value (k), the throughputs of both decoders 602 and 604 vary with one another, which also prevents bottlenecking between them. Additionally, decoder 106 can include enough decoding channels 606(1)-606(n) to take advantage of this increased throughput and to prevent bottlenecking. In a non-limiting embodiment, the number (n) of decoding channels 606(1)-606(n) can be determined by:

$$n \geq \mathrm{INT} \frac{Q}{Q-k},$$

where Q represents the number of coefficients in each block of data and INT is the integer function.

It is also important to note that, while the present invention has been described with respect to a JPEG codec, run-length decoder 604 will still provide important advantages in any decoder that employs run-length decoding. Run-length decoder 604 improves the decoding speed of RLE data because it decodes each coefficient (not necessarily quantized coefficients) having a predetermined value simultaneously by first loading that predetermined value in all the storage locations of a buffer. As a result, only the coefficients that have values different than the predetermined value need to be individually decoded and stored in the buffer. Thus, run-length decoder 604 improves run-length decoding performance over prior art run-length decoders, particularly ones that decode each coefficient individually.

For these same reasons, it is also important to note that output channel director 708 (FIG. 7) is an optional component. Even in a run-length decoder 604 having only one output 712, run-length decoder 604 would still speed up the run-length decoding process for the above reasons. Indeed, run-length decoder 604 provides performance advantages for any value of (k) and even in the absence of a plurality of parallel decoding channels 606(1)-606(n).

Figure 9:
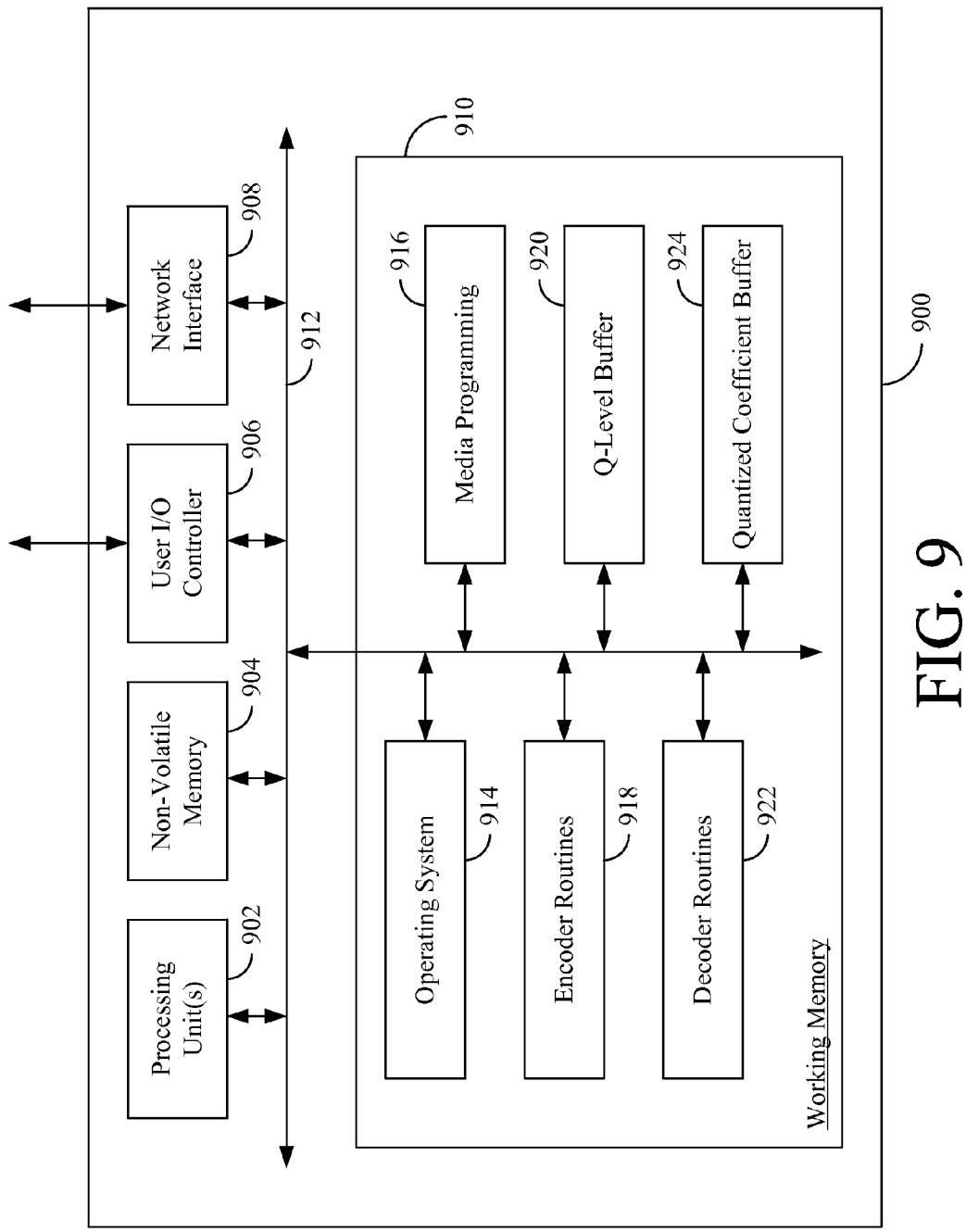
FIG. 9 is a block diagram of a computer system 900 showing the encoder and/or decoder of the present invention implemented in software.

FIG. 9 is a block diagram of a computer system 900 showing the encoder and/or the decoder of the present invention implemented in software, e.g., in an electronically-readable medium. Computer system 900 includes one or more processing unit(s) (CPU) 902, non-volatile memory 904, a user I/O controller 906, a network interface 908, and a working memory 910 all intercommunicating via a system bus 912. CPU(s) 902 execute(s) data and code contained in working memory 910 to cause computer system 900 to carry out its intended functions (e.g. image processing, video playback, etc.). Non-volatile memory 904 (e.g. read-only memory, one or more hard disk drives, flash memory, etc.) provides storage for data and code (e.g., boot code, programs, compressed image files, etc.) that are retained even when computer system 900 is powered down. User I/O controller 906 manages connections for user interface devices (not shown), for example a keyboard, mouse, monitor, printer, camera, and other such devices that facilitate communications between computer system 900 and a user. Network interface 908 (e.g. an Ethernet adapter card) transmits data packets onto and receives data packets from an internetwork (e.g., the Internet), such that a user can send and receive data (e.g., image data) via the internetwork. System bus 912 facilitates intercommunication between the various components of computer system 900.

Working memory 910 (e.g. random access memory) provides dynamic memory to computer system 900, and includes executable code (e.g. an operating system 914, etc.), which is loaded into working memory 910 during system start-up. Operating system 914 facilitates control and execution of all other modules loaded into working memory 910. Working memory 910 also includes media programming 916 (e.g., an image viewer, movie player, etc.) that uses media compression (e.g., JPEG, MPEG, etc.) to encode and/or decode media data. Encoder routines 918 represent routines that perform any and all of the functionality of encoder 104 described previously herein. Encoder routines 918 utilize a Q-Level buffer 920, which can operate as a FIFO, to store block-specific Q-levels generated during the encoding process. Compressed data generated by encoder routines 918 can be temporarily stored in working memory 910 or can be stored long-term in non-volatile memory 904. Optionally, the Q-levels stored in buffer 920 can also be stored in non-volatile memory 904 as part of the compressed data file or as a separate file. Working memory 910 also includes decoder routines 922 that can perform any and all of the functionality of decoder 106 described herein. Working memory 910 also includes a quantized coefficient buffer 924, which provides the function of the coefficient buffer 704 of FIG. 7.

Each of the foregoing programs and buffers are initialized in and/or loaded into working memory 910 from non-volatile memory 904 using methods well known to those skilled in the art. Optionally, the foregoing programs and buffers can be loaded into working memory 910 from alternate mass data storage devices including, but not limited to, a CD-ROM, DVD-ROM, flash drive, etc. Additionally, some or all of the programs described can be loaded into working memory 910 as needed. For example, decoder routines 922 can be executed without loading encoder routines 918 (e.g., for stored image playback, etc.). Likewise, encoder routines 918 can be executed without executing the decoder routines (e.g., for image storage).

The methods of the present invention will now be described with reference to FIGS. 10-13. For the sake of clear explanation, these methods might be described with reference to particular elements of the previously-described embodiments that perform particular functions. However, it should be noted that other elements, whether explicitly described herein or created in view of the present disclosure, could be substituted for those cited without departing from the scope of the present invention. Therefore, it should be understood that the methods of the present invention are not limited to any particular element(s) that perform(s) any particular function(s). Further, some steps of the methods presented need not necessarily occur in the order shown. For example, in some cases two or more method steps may occur simultaneously. These and other variations of the methods disclosed herein will be readily apparent, especially in view of the description of the present invention provided previously herein, and are considered to be within the full scope of the invention.

Figure 10:
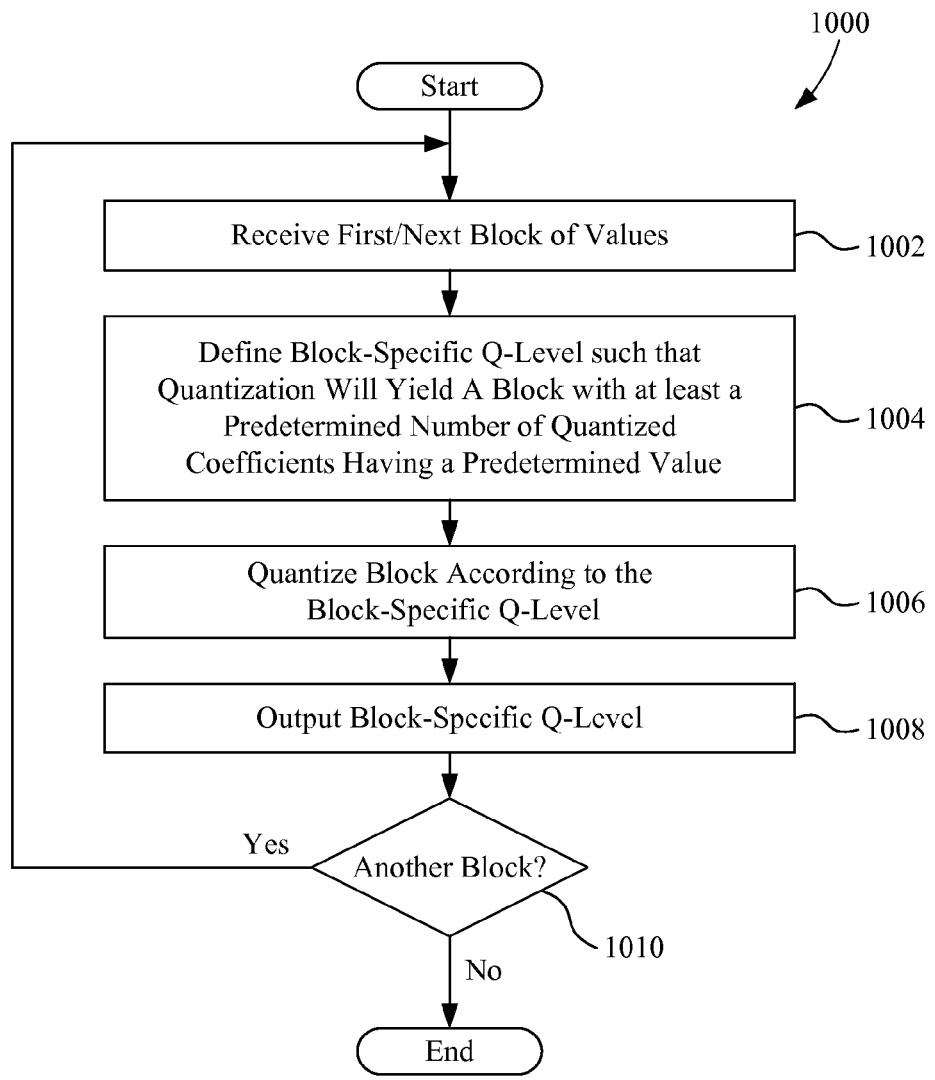
FIG. 10 is a flowchart summarizing a method for encoding data according to the present invention.

FIG. 10 is a flowchart summarizing a method 1000 for encoding data according to the present invention. In a first step 1002, a block of values (e.g., a block of transform coefficients associated with a plurality of pixels of an image) is received. In a second step 1004, a block-specific quantization level ("Q-level") is defined for the block of values. The Q-level is defined such that a quantization process on the block of values based on the block-specific Q-level will produce a block of quantized coefficients having at least a predetermined number of quantized coefficients with a predetermined value (e.g., zero). In a third step 1006, the block of values is quantized according to the block-specific Q-level defined in step 1004 to produce the block of quantized coefficients including at least the predetermined number of quantized coefficients having the predetermined value. In a fourth step 1008, the block specific Q-level is output (e.g., to a memory, etc.) for use during subsequent decoding. In a fifth step 1010, it is determined whether there is another block of values that needs encoding. If so, method 1000 returns to step 1002. If not, method 1000 ends.

Figure 11:
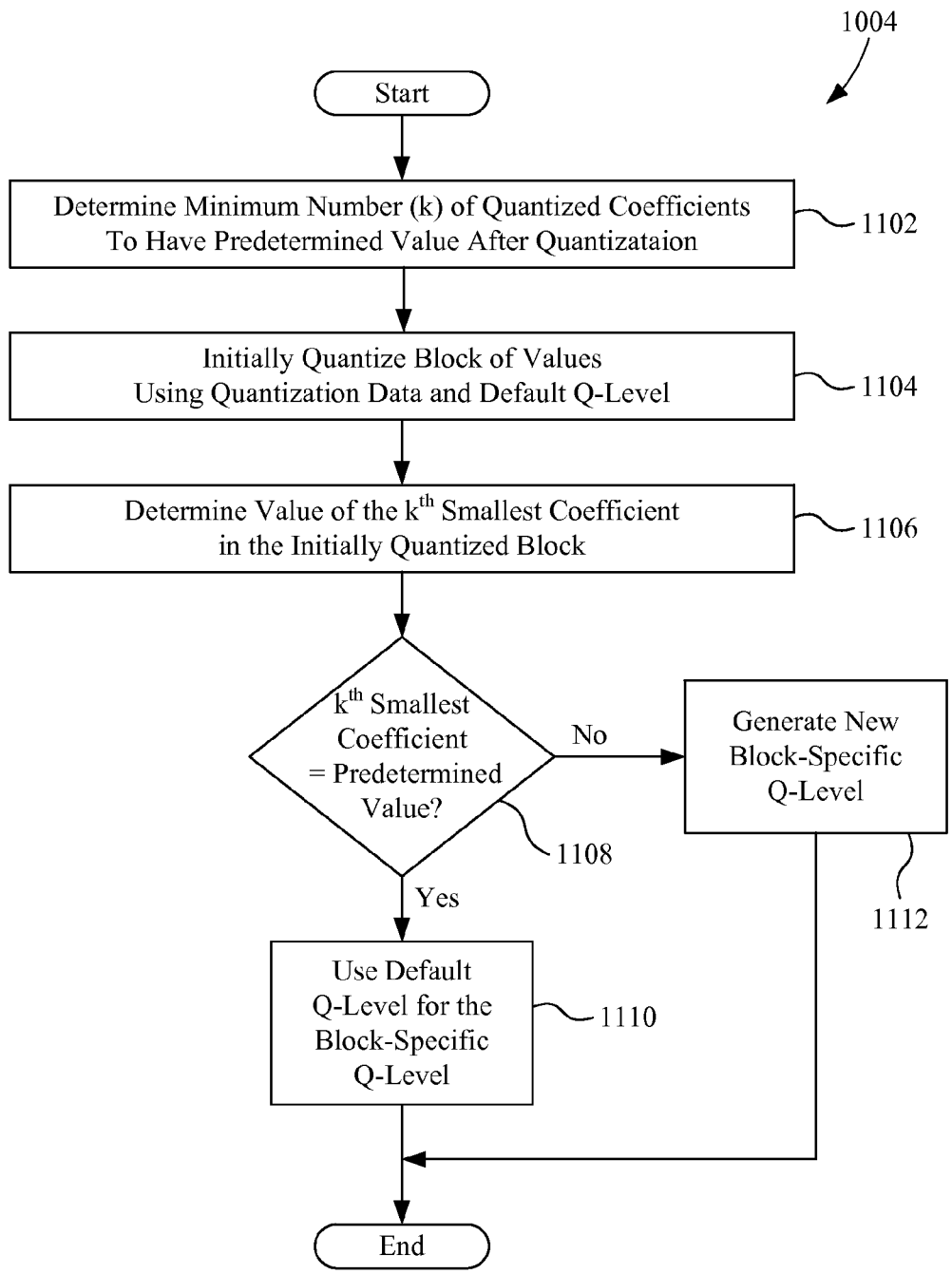
FIG. 11 is a flowchart summarizing a particular method for performing the third step of the method of FIG. 10.

FIG. 11 is a flowchart summarizing a particular method for performing the second step 1004 (define Q-level for block) of FIG. 10. A first step 1102 includes determining the minimum number (k) of quantized coefficients that must have the predetermined value in a quantized block following quantization. As indicated above, the value (k) can be fixed for all blocks or it can change periodically based on some other parameter (e.g., desired decoder speed indicated by the speed control signal on input 120, desired decoded image quality, etc.). In a second step 1104, the block of values (e.g., transform coefficients) is initially quantized using quantization data and a default Q-level to produce a test block of quantized coefficients. In a third step 1106, the value of the $k^{th}$ smallest quantized coefficient in the test block is determined, and in a fourth step 1108, it is determined whether the value of the $k^{th}$ smallest quantized coefficient is equal to the predetermined value (e.g., zero). If so, then in a fifth step 1110, the default Q-level is defined as the block-specific Q-level in step 1008 of FIG. 10, and the method ends.

If in step 1108 it is determined that the value of the $k^{th}$ smallest quantized coefficient is not zero, then the method proceeds to a sixth step 1112 where a new block-specific Q-level is generated and the method ends.

Figure 12:
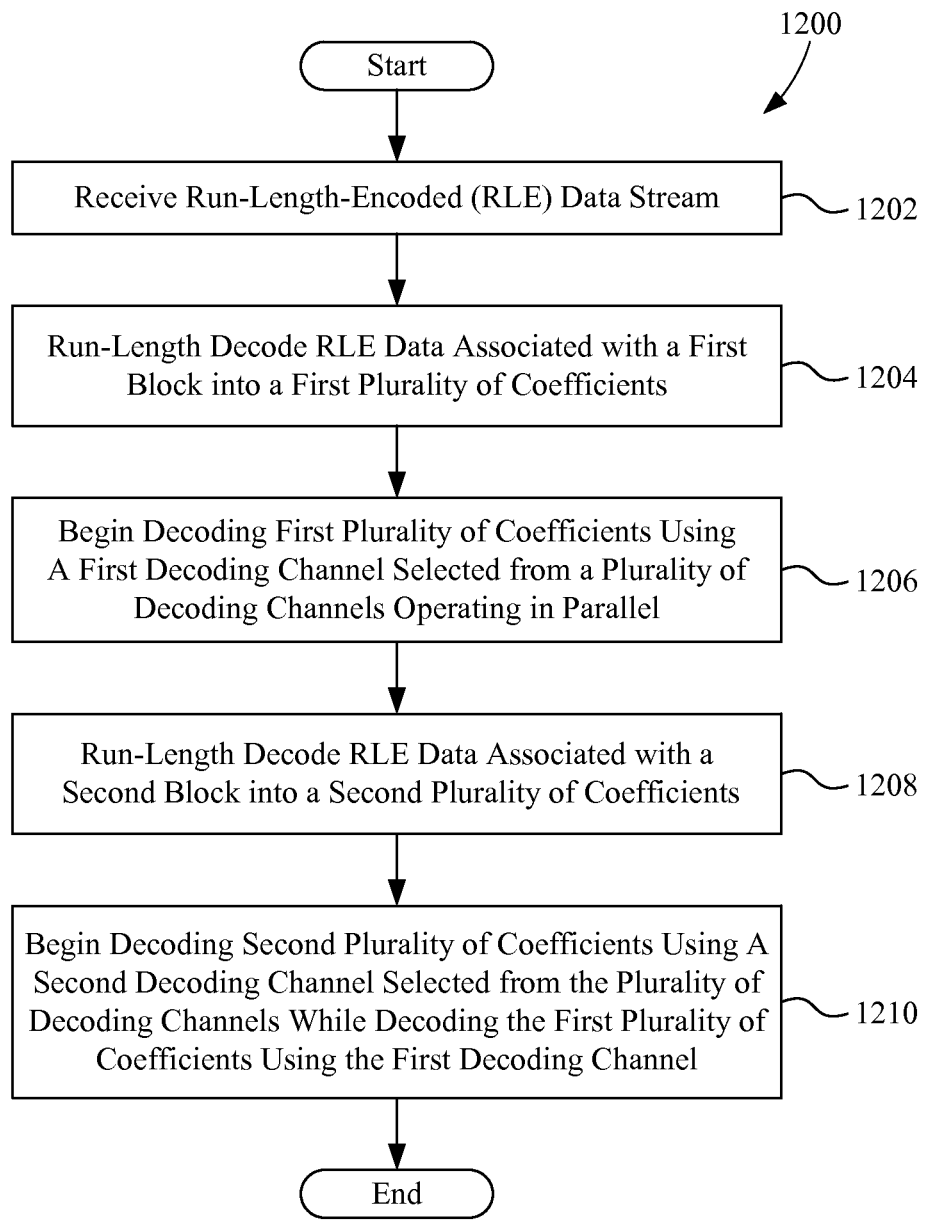
FIG. 12 is a flowchart summarizing a method for decoding an encoded data stream according to the present invention.

FIG. 12 is a flowchart summarizing a method 1200 of decoding a data stream according to the present invention. In a first step 1202, a decoder receives a run-length-encoded (RLE) data stream, for example, that is output from an entropy decoder. In a second step 1204, the decoder run-length decodes RLE data to produce a first plurality of values (e.g., quantized coefficients). In a third step 1206, the first plurality of coefficients begins further decoding using a first decoding channel 606(1) selected from a plurality of decoding channels 606(1)-606(n) operating in parallel. In a fourth step 1208, decoder 106 run-length decodes RLE data to produce a second plurality of values (e.g., quantized coefficients). In a fifth step 1210, the second plurality of coefficients begins further decoding using a second decoding channel 606(2) selected from the plurality of decoding channels 606(1)-606(n) such that the first and second pluralities of coefficients are at least partially further decoded concurrently.

Figure 13:
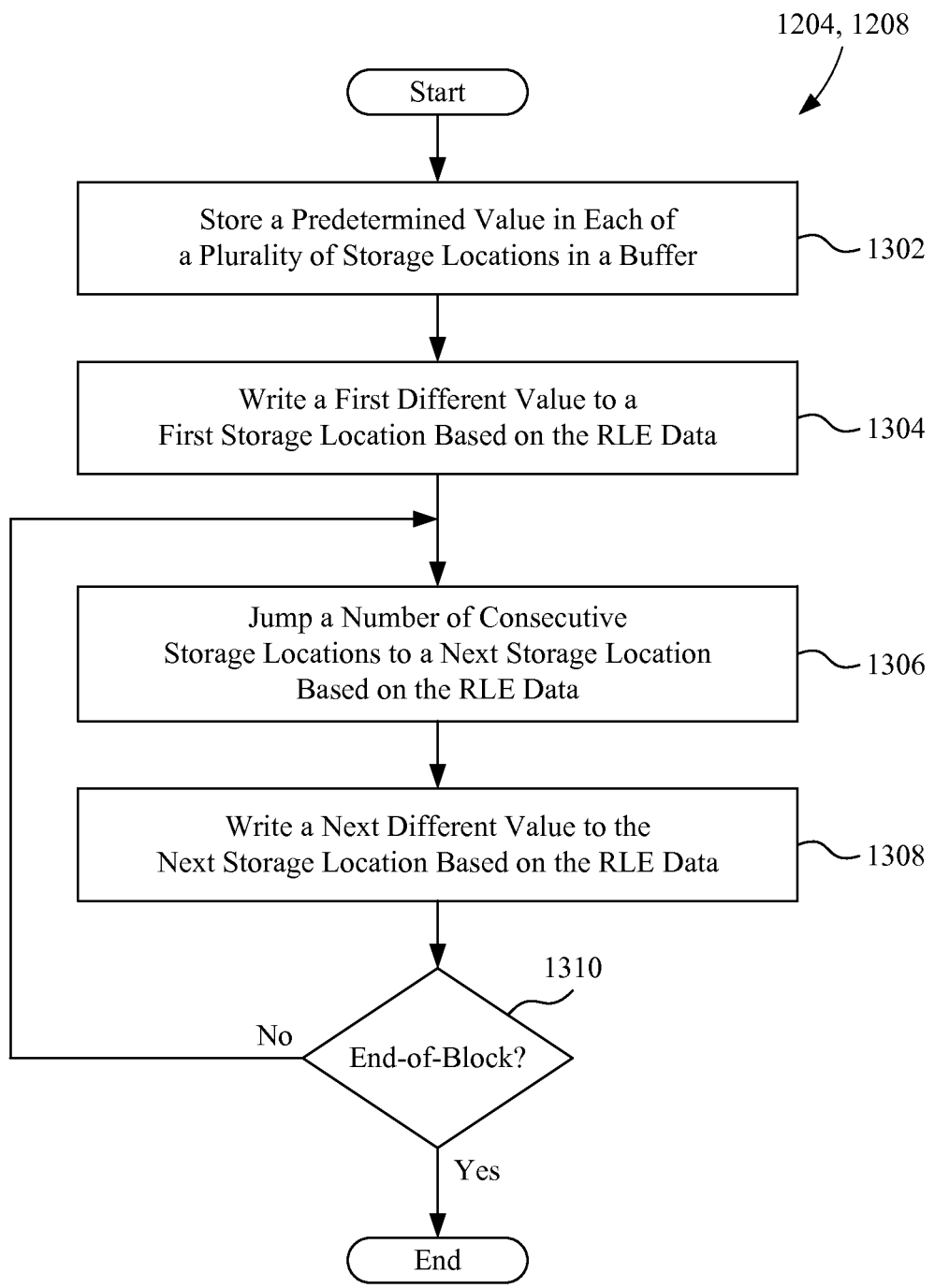
FIG. 13 is a flowchart summarizing a method for performing the second step and/or the fourth step of the method of FIG. 12.

FIG. 13 is a flowchart summarizing a particular method for performing either of the steps 1204 and 1208 (run-length decode RLE data) of FIG. 12. In a first step 1302 of the run-length decoding process, a predetermined value (e.g., zero) is stored in each of a plurality of storage locations of a coefficient buffer 704. In a second step 1304, a first value different than the predetermined value is written to a first storage location 812 of the coefficient buffer 704 based on the RLE data. In a third step 1306, a number of consecutive storage locations 812 are jumped from the first storage location 812 to a next storage location 812 based on the RLE data. Then, in a fourth step 814, a next value different than the predetermined value is written to the next storage location 812 based on the RLE data. Then, in a fifth step 1310, it is determined whether an end-of-block code in the RLE data has been encountered. If so, the method ends. If not, the method returns to third step 1306 to write another next coefficient to another next storage location based on the RLE data.

The description of particular embodiments and methods of the present invention is now complete. Many of the described features may be substituted, altered or omitted without departing from the scope of the invention. For example, while the present invention has been described with respect to JPEG compression, the present invention is equally applicable to other data compression codecs and methods that involve quantization, entropy, and/or run-length encoding and decoding (e.g., MPEG, etc.). As another example, speed control input 120 may be omitted and the run-length decoder 604 of the decoder 106 can adjust its run-length decoding automatically based on the RLE data as it is received. These and other deviations from the particular embodiments shown will be apparent to those skilled in the art, particularly in view of the foregoing disclosure.

I claim:

1. In an integrated circuit, a method for decoding encoded data, said method comprising:
   receiving a run-length-encoded (RLE) data stream including RLE data associated with a series of blocks of data;
   run-length decoding RLE data associated with a first block of data into a first plurality of values;
   decoding said first plurality of values using a first decoding channel selected from a plurality of decoding channels operating in parallel;
   run-length decoding RLE data associated with a second block of data into a second plurality of values; and
   decoding said second plurality of values using a second decoding channel selected from said plurality of decoding channels; and wherein
   said step of decoding said second plurality of values occurs at least partially during said step of decoding said first plurality of values;
   said first and said second pluralities of values are pluralities of quantized coefficients;
   said step of decoding said first plurality of quantized coefficients includes
      receiving a first quantization level associated with said first block, and
      dequantizing said first plurality of quantized coefficients based on said first quantization level; and
   said step of decoding said second plurality of quantized coefficients includes
      receiving a second quantization level associated with said second block, said second quantization level being different than said first quantization level, and
      dequantizing said second plurality of quantized coefficients based on said second quantization level.

2. The method of claim 1, wherein said RLE data associated with said second block is received next after said RLE data associated with said first block.

3. The method of claim 1, wherein:
   said step of receiving said first quantization level includes reading said first quantization level from a memory; and
   said step of receiving said second quantization level includes reading said second quantization level from said memory after reading said first quantization level from said memory.

4. The method of claim 3, wherein said memory is a First-In-First-Out (FIFO) memory storing a series of quantization levels, including said first quantization level and said second quantization level.

5. The method of claim 1, wherein said step of run-length decoding said RLE data associated with said first block of data includes:
   storing a predetermined value in each of a plurality of consecutively-accessible storage locations of a buffer;
   writing a first value different than said predetermined value to a first storage location based on said RLE data associated with said first block;
   skipping a number of said consecutively-accessible storage locations from said first storage location to a next storage location based on said RLE data associated with said first block, said number being at least one; and
   writing a next value different than said predetermined value to said next storage location based on said RLE data associated with said first block.

6. The method of claim 5, wherein:
   said RLE data associated with said first block includes a plurality of pairs of values;
   each said pair of values includes a first value indicating a run length of values having said predetermined value and a second value different than said predetermined value; and
   the number of said consecutively-accessible storage locations that are skipped is equal to said first value in one of said plurality of pairs of values.

7. The method of claim 6, wherein said step of skipping includes incrementing a pointer a number of times equal to one plus said first value of said one of said plurality of pairs of values.

8. The method of claim 5, wherein said step of run-length decoding said RLE data associated with said second block of data includes:
   resetting each of said plurality of consecutively-accessible storage locations of said buffer to said predetermined value;
   writing a first value different than said predetermined value to a first storage location based on said RLE data associated with said second block;
   skipping a number of said consecutively-accessible storage locations from said first storage location for said second block to a next storage location for said second block based on said RLE data associated with said second block, said number for said second block being at least one; and
   writing a next value different than said predetermined value to said next storage location for said second block based on said RLE data associated with said second block.

9. The method of claim 5, wherein said predetermined value is zero.

10. The method of claim 1, wherein:
    the number of said plurality of decoding channels is greater than or equal to $$\text{INT} \frac{Q}{Q-k};$$

Q represents the number of coefficients in each of said first plurality of values and said second plurality of values;
    k represents the number of values in each of said first plurality of values and said second plurality of values that must have a predetermined value; and
    INT is the integer function.

11. The method of claim 1, further comprising:
    receiving an entropy-encoded data stream including entropy-encoded data associated with a series of blocks of image data; and
    decoding said entropy-encoded data stream to produce said RLE data stream; and wherein
    said step of decoding said first plurality of quantized coefficients using said first decoding channel further includes
       performing an inverse zig-zag process on said first plurality of quantized coefficients to produce a first block of quantized coefficients, dequantizing said first block of quantized coefficients based on said first quantization level to produce a first block of transform coefficients, said first quantization level being specific to said first block of quantized coefficients, and performing an inverse discrete cosine transform (DCT) on said first block of transform coefficients to produce a first block of decoded image data; and said step of decoding said second plurality of quantized coefficients using said second decoding channel further includes performing said inverse zig-zag process on said second plurality of quantized coefficients to produce a second block of quantized coefficients, dequantizing said second block of quantized coefficients based on said second quantization level to produce a second block of transform coefficients, said second quantization level being specific to said second block of quantized coefficients, and performing said inverse DCT on said second block of transform coefficients to produce a second block of decoded image data.

12. A decoder comprising:

an input operative to receive a run-length-encoded (RLE) data stream including RLE data associated with a series of blocks of data;

a run-length decoder operative to decode RLE data associated with a first block of data into a first plurality of values and to decode RLE data associated with a second block of data into a second plurality of values; and a plurality of decoding channels operating in parallel, said plurality of decoding channels including a first decoding channel operative to decode said first plurality of values and a second decoding channel operative to at least partially decode said second plurality of values while said first decoding channel is decoding said first plurality of values; and wherein said first and said second pluralities of values are pluralities of quantized coefficients;

said first decoding channel includes an input operative to receive a first quantization level associated with said first block of data and a dequantizer operative to dequantize said first plurality of quantized coefficients based on said first quantization level;

said second decoding channel includes an input operative to receive a second quantization level associated with said second block of data and a dequantizer operative to dequantize said second plurality of quantized coefficients based on said second quantization level; and said second quantization level is different than said first quantization level.

13. The decoder of claim 12, wherein said RLE data associated with said second block is received next after said RLE data associated with said first block.

14. The decoder of claim 12, wherein said first decoding channel and said second decoding channel are operative to consecutively read said first quantization level and said second quantization level from a memory.

15. The decoder of claim 14, wherein said memory is a First-In-First-Out (FIFO) memory storing a series of quantization levels, including said first quantization level and said second quantization level.

16. The decoder of claim 12, wherein said run-length decoder is further operative to:

store a predetermined value in each of a plurality of consecutively-accessible storage locations of a buffer;

write a first value different than said predetermined value to a first storage location of said buffer based on said RLE data associated with said first block;

move a number of said consecutively-accessible storage locations in said buffer from said first storage location to a next storage location based on said RLE data associated with said first block, said number being at least two; and write a next value different than said predetermined value to said next storage location based on said RLE data associated with said first block.

17. The decoder of claim 16, wherein:

said RLE data associated with each of said blocks of said image data includes a plurality of pairs of values;

each said pair of values includes a first value indicating a run length of values having said predetermined value and a second value different than said predetermined value; and said run-length decoder is operative to move said number of said consecutively-accessible storage locations equal to said first value of one of said plurality of pairs of values.

18. The decoder of claim 17, wherein, to move said number of consecutively-accessible storage locations, said run-length decoder is operative to increment a pointer a number of times equal to one plus said first value of said one of said plurality of pairs of values.

19. The decoder of claim 16, wherein said run-length decoder is further operative to reset each of said plurality of consecutively-accessible storage locations to said predetermined value each time said run-length decoder receives said RLE data associated with a new block of data.

20. The decoder of claim 16, wherein said predetermined value is zero.

21. The decoder of claim 12, wherein:

the number of said plurality of decoding channels is greater than or equal to $$\text{INT}\frac{Q}{Q-k};$$

Q represents the number of values in each of said first plurality of values and said second plurality of values;

k represents the number of coefficients in each of said first plurality of values and said second plurality of values that must have a predetermined value; and INT is the integer function.

22. The decoder of claim 12, further comprising:

an input operative to receive an entropy-encoded data stream including entropy-encoded data associated with a series of blocks of image data; and an entropy decoder operative to decode said entropy-encoded data stream to produce said RLE data stream; and wherein each of said plurality of decoding channels includes an inverse zig-zag unit operative to perform an inverse zig-zag process on a plurality of quantized coefficients to produce a block of quantized coefficients, a dequantizer operative to dequantize said block of quantized coefficients into a block of transform coefficients based on a quantization level specific to said block of quantized coefficients, and an inverse discrete cosine transform (DCT) unit operative to perform an inverse DCT on said block of transform coefficients to produce a block of decoded image data.

23. A non-transitory, electronically-readable storage medium having code embodied therein for causing an electronic device to:
- receive a run-length-encoded (RLE) data stream including RLE data associated with a series of blocks of data;
- run-length decode RLE data associated with a first block of data into a first plurality of quantized coefficients;
- decode said first plurality of values using a first decoding channel selected from a plurality of decoding channels operating in parallel by
  - receiving a first quantization level associated with said first block and
  - dequantizing said first plurality of quantized coefficients based on said first quantization level;
- run-length decode RLE data associated with a second block of data into a second plurality of quantized coefficients; and
- decode said second plurality of values using a second decoding channel selected from said plurality of decoding channels by
  - receiving a second quantization level associated with said second block, said second quantization level being different than said first quantization level and
  - dequantizing said second plurality of quantized coefficients based on said second quantization level; and wherein
- said step of decoding said second plurality of values occurs at least partially during said step of decoding said first plurality of values.

* * * * *